US009661825B2

(12) United States Patent
Becattini, Jr. et al.

(10) Patent No.: US 9,661,825 B2
(45) Date of Patent: May 30, 2017

(54) PET WASTE SCOOP ASSEMBLY

(71) Applicant: Towerstar Pets, LLC, Malvern, PA (US)

(72) Inventors: Fernando Becattini, Jr., Malvern, PA (US); Fernando Becattini, Sr., Devon, PA (US); Jacquelyn N. Becattini, Malvern, PA (US); Steve A. Copeland, Barrie (CA); Mitchell Thompson, Barrie (CA)

(73) Assignee: Towerstar Pets, LLC, Malvern, PA (US)

( * ) Notice: Subject to any disclaimer, the term of this patent is extended or adjusted under 35 U.S.C. 154(b) by 0 days.

(21) Appl. No.: 15/225,220

(22) Filed: Aug. 1, 2016

(65) Prior Publication Data

US 2016/0338309 A1    Nov. 24, 2016

Related U.S. Application Data

(63) Continuation of application No. 14/826,778, filed on Aug. 14, 2015, now Pat. No. 9,428,873, which is a
(Continued)

(51) Int. Cl.
*A01K 29/00*  (2006.01)
*E01H 1/12*  (2006.01)
(Continued)

(52) U.S. Cl.
CPC .............. *A01K 1/0114* (2013.01); *B07B 1/02* (2013.01); *E01H 1/1206* (2013.01); *E01H 2001/128* (2013.01); *Y10T 29/49817* (2015.01)

(58) Field of Classification Search
CPC . E01H 1/1206; E01H 2001/128; A01K 1/011; A01K 1/0114; B07B 1/02; Y10T 29/49817
(Continued)

(56) References Cited

U.S. PATENT DOCUMENTS 1,426,442 A    8/1922  Ferdinand
1,987,011 A    1/1935  Kahn
(Continued)

FOREIGN PATENT DOCUMENTS

GB    2243535        11/1991
JP    2005287417    10/2005
JP    2011062190     3/2011

OTHER PUBLICATIONS http://www.swirl.de/en/Cat-litter-scoop-from-Swirl-260.html, Cat litter scoop from Swirl, 4 pages. Document is undated but the document was printed from the pertinent website on Jan. 14, 2015.

*Primary Examiner* — Dean Kramer
(74) *Attorney, Agent, or Firm* — Sand & Sebolt

(57) ABSTRACT

A pet scoop assembly and method of use is provided. The assembly includes a scoop member; a receptacle detachably engageable with the scoop member; and a door disposed intermediate the two. A disposable bag may line the receptacle and be clamped in place between the receptacle and scoop member. The door opens inwardly into the receptacle. When the scoop assembly is turned into a vertical orientation, the door opens by a weighted member attached to the door. A region of the scoop member adjacent the door is angled to allow pet waste to slide readily from the scoop member into the receptacle.

18 Claims, 13 Drawing Sheets

Related U.S. Application Data continuation of application No. 14/519,239, filed on Oct. 21, 2014, now Pat. No. 9,133,592.

(60) Provisional application No. 61/916,493, filed on Dec. 16, 2013.

(51) Int. Cl.
 *A01K 1/01* (2006.01)
 *B07B 1/02* (2006.01)

(58) Field of Classification Search
 USPC .................................................. 294/1.3, 1.4
 See application file for complete search history.

(56) References Cited

U.S. PATENT DOCUMENTS

| | | | |
|---|---|---|---|
| D137,440 S | 3/1944 | Long | |
| D176,658 S | 1/1956 | Emerson | |
| D207,116 S | 3/1967 | Phillips | |
| 3,490,501 A | 1/1970 | Manem et al. | |
| 3,942,427 A | 3/1976 | Vaca | |
| 3,986,744 A | 10/1976 | Krogstad et al. | |
| 4,096,827 A | 6/1978 | Cotter | |
| 4,149,745 A | 4/1979 | Willis | |
| D255,951 S | 7/1980 | Halls et al. | |
| 4,226,456 A | 10/1980 | Barnett | |
| 4,341,410 A | 7/1982 | Summach | |
| D267,357 S | 12/1982 | Hillstrom | |
| 4,368,907 A * | 1/1983 | Ross | E01H 1/1206 294/1.4 |
| D285,012 S | 8/1986 | Willis | |
| D292,261 S | 10/1987 | Mitton | |
| D296,406 S | 6/1988 | Fuller | |
| D309,966 S | 8/1990 | Bishop | |
| D310,436 S | 9/1990 | Krauth | |
| D314,254 S | 1/1991 | Gordon | |
| D318,350 S | 7/1991 | Muffuletto | |
| D332,675 S | 1/1993 | Simon | |
| 5,190,326 A | 3/1993 | Nunn | |
| D347,497 S | 5/1994 | VanSkiver | |
| 5,382,063 A | 1/1995 | Wesener | |
| D363,008 S | 10/1995 | Pearson | |
| 5,575,520 A | 11/1996 | Northcutt | |
| 5,580,111 A | 12/1996 | Bohn | |
| D387,514 S | 12/1997 | Savicki | |
| 5,711,564 A * | 1/1998 | Campbell | A01K 1/0114 294/1.3 |
| D404,855 S | 1/1999 | Dotson | |
| 5,921,596 A | 7/1999 | Sheriff | |
| 6,022,058 A | 2/2000 | O'Rourke | |
| 6,039,368 A | 3/2000 | Kowalczyk | |
| D426,353 S | 6/2000 | Renforth | |
| D429,853 S | 8/2000 | Hammond | |
| D438,349 S | 2/2001 | Keller | |
| D441,159 S | 4/2001 | Cann | |
| 6,237,973 B1 | 5/2001 | Dupont et al. | |
| 6,312,029 B1 | 11/2001 | Renforth | |
| D479,105 S | 9/2003 | Debord | |
| 6,941,896 B1 | 9/2005 | Morin | |
| 6,976,661 B2 | 12/2005 | Lipscomb et al. | |
| 7,047,907 B1 | 5/2006 | Johnston | |
| D604,915 S | 11/2009 | Teper et al. | |
| D609,983 S | 2/2010 | Claypool | |
| 7,686,360 B2 | 3/2010 | Platt | |
| D635,310 S | 3/2011 | Jessmon | |
| D675,070 S | 1/2013 | Rockwell | |
| 8,408,614 B2 | 4/2013 | Lipscomb et al. | |
| D694,592 S | 12/2013 | Hukill | |
| 8,919,708 B1 | 12/2014 | Graves | |
| 8,985,653 B1 | 3/2015 | Kest | |
| 9,133,592 B2 | 9/2015 | Becattini et al. | |
| 9,428,873 B2 * | 8/2016 | Becattini, Jr. | E01H 1/1206 |
| 2004/0090073 A1 | 5/2004 | Edwards | |
| 2004/0227364 A1 | 11/2004 | Pain | |
| 2006/0087133 A1 | 4/2006 | Borngesser | |
| 2006/0156991 A1 | 7/2006 | Burns et al. | |
| 2006/0243867 A1 | 11/2006 | Strickland et al. | |
| 2007/0096483 A1 | 5/2007 | Binkowski et al. | |
| 2007/0170732 A1 | 7/2007 | Platt | |
| 2007/0267333 A1 | 11/2007 | Delman | |
| 2008/0072832 A1 | 3/2008 | Novella | |
| 2008/0265592 A1 | 10/2008 | Askinasi | |
| 2009/0038553 A1 | 2/2009 | Lin et al. | |
| 2009/0058115 A1 | 3/2009 | Freedman et al. | |
| 2010/0164240 A1 | 7/2010 | Moore | |
| 2011/0181064 A1 | 7/2011 | Moore | |
| 2011/0233948 A1 | 9/2011 | Morris | |
| 2015/0167265 A1 | 6/2015 | Becattini et al. | |

\* cited by examiner

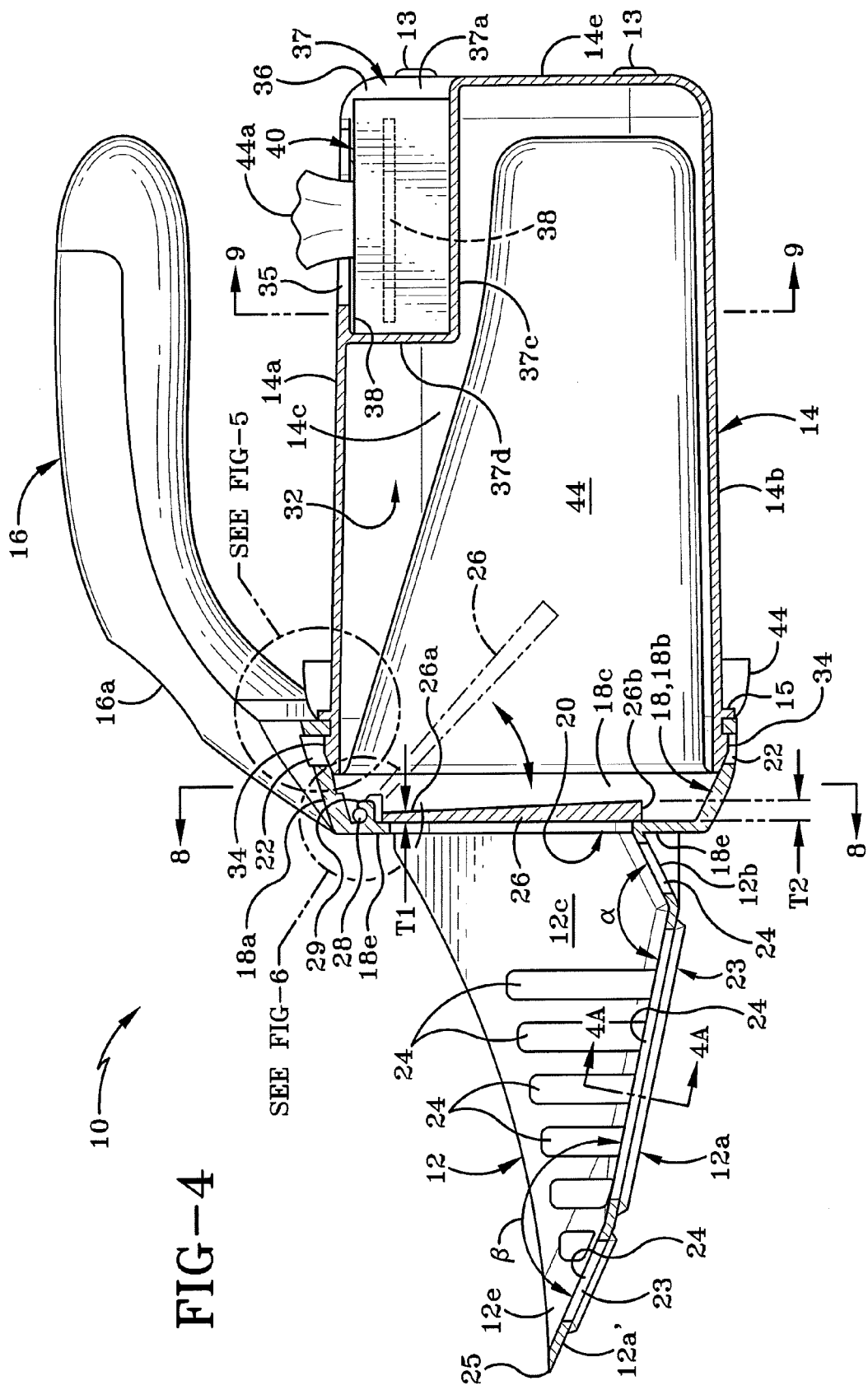

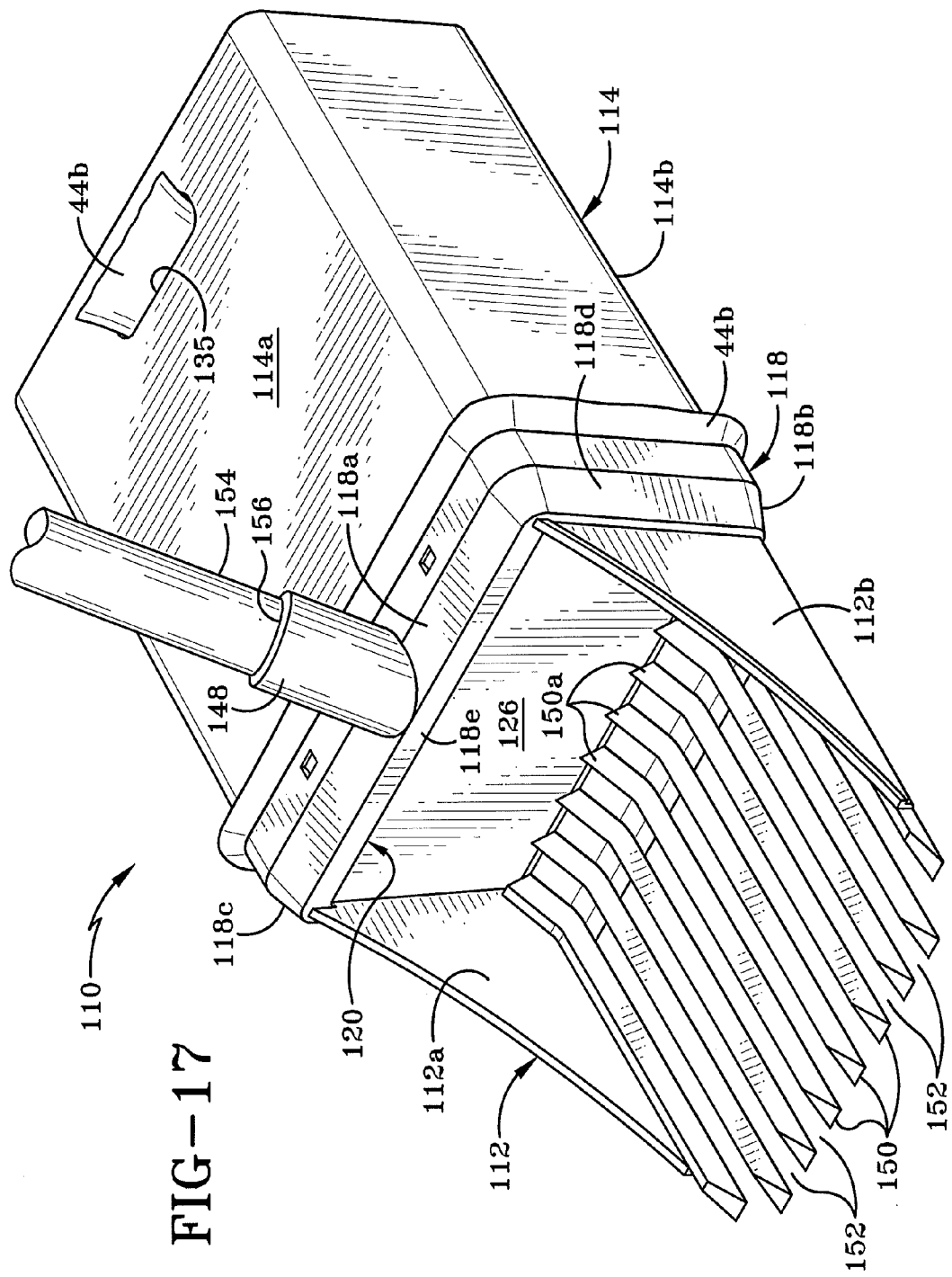

PET WASTE SCOOP ASSEMBLY

CROSS-REFERENCE TO RELATED APPLICATIONS

This application is a continuation of prior U.S. patent application Ser. No. 14/826,778, filed on Aug. 14, 2015, which is a continuation of U.S. patent application Ser. No. 14/519,239, filed Oct. 21, 2014, now U.S. Pat. No. 9,133,592, which claims the benefit of U.S. Provisional Patent Application Ser. No. 61/916,493 filed Dec. 16, 2013, the entire specifications of which are incorporated herein by reference.

BACKGROUND OF THE INVENTION

Technical Field

This invention relates generally to pet supplies. More particularly this invention relates to pet waste scoops. Specifically, the invention is directed to a scoop assembly for removing clumped waste material from pet litter boxes or from surfaces such as grass; which scoop assembly includes a detachably engageable scoop member and receptacle separated from each other by a movable door; where the door opens to permit pet waste to slide into the receptacle and closes afterward to secure the waste in the receptacle.

Background Information

Ever since humans domesticated dogs and cats and welcomed them into their homes, disposing of their waste products has been an issue. This issue has grown exponentially as more people now live in urban environments than ever before. In many instances pets, particularly cats are kept indoors at all times and the pets therefore have to utilize litter boxes. Litter boxes are typically filled with specially designed litter materials that form clumps around urine and feces. These litter boxes need to be cleared of pet waste on a regular basis in order to prevent unpleasant odors from overtaking the home. It is only needful for the homeowner to remove these pet waste clumps from the litter box to keep the home odor free and so that the cat will continue to use the litter box rather than go elsewhere in the house.

In the case of dogs, many pet owners will either release their animals into a yard to relieve themselves or, if a yard is not available, they will take their dogs on walks for the same purpose. Thus, instead of eliminating in a litter box, dogs may eliminate on grass, or sand or even concrete. This pet waste also has to be cleaned up.

Since it is undesirable to directly handle the pet waste clumps in litter boxes or the pet waste in grass or on other surfaces, a variety of pet letter scoops have been developed. For example, U.S. Pat. No. 5,580,111 (Bohn) discloses a scoop for animal waste. The scoop defines a plurality of apertures in a bottom wall thereof and through which unsoiled pet litter will drop back into a litter box. Alternatively, the bottom wall may be formed into a plurality of tines or fingers which are separated from each other by apertures. A collection container (i.e., a bag) is engageable with one end of a funnel on the scoop. The scoop is moved into a substantially vertical position to cause captured waste to slide down the funnel and into the bag. The weight of the pet waste causes the bag to hang downwardly from the scoop and may interfere with lifting additional pet waste from a litter box. A tongue is therefore provided on the scoop to cause the bag to be held a distance away from the scoop end of the device. Once all the waste is removed from the litter box, the bag is detached from the scoop and is disposed of. One of the problems with this device is that the user has to hold the funnel portion of the device with one hand and hold the bag in engagement with the funnel portion with the other hand when the device is being used. If the user's second hand slips during the motion where the scoop is moved to the vertical, the bag could separate from the funnel causing the waste to miss the bag and drop onto some other surface.

U.S. Pat. No. 7,686,360 (Platt) discloses a device comprising a scoop which has a funnel integrally formed therewith and extending outwardly from one end thereof. A bag may be pulled up around a free end of the funnel and is locked into place by way of clips provided on the exterior surface of the funnel. An upstanding wall is provided between the bottom wall of the scoop portion of the device and the bottom wall of the funnel portion of the device. The upstanding wall is provided to prevent already-gathered pet waste from sliding from the funnel back down the scoop when the scoop is used to pick up additional pet waste. The funnel is moved to a vertical position to cause the pet waste to slide through the funnel and into the bag. When the litter box is cleaned, the bag is detached from the funnel and is thrown away. One of the problems with this device is the presence of the horizontal wall. The scoop includes a gently sloped back region (adjacent the funnel) which is supposedly there to help captured pet waste to slide into the funnel. In order to move the waste from the scoop to the funnel, the device is moved to an orientation where the funnel is generally vertical. However, it is necessary for the waste to get past the now horizontally-oriented wall as it will have a tendency to just sit there on the wall. So, it is necessary for the user to give the device a little shake to dislodge the waste so that it will drop into the funnel. This, of course, could result in the waste flying completely out of the device if the "little shake" is too vigorous.

GB 2243535 (Lowrie) discloses a device having a housing that is shaped to be able to be used as a scoop. The housing defines a cavity therein and a bag is received within this cavity and is positioned so that it overlaps the rim of the housing. A rotatable barrel is received within the housing and at least a base portion thereof is accessible outside a bottom end of the housing and the bag extends into the barrel. A door is mounted at the forward-most end of the housing and is movable between an open position and a closed position. The door includes a protuberance which is engaged by a person's thumb to cause the door to pivot outwardly away from the housing and into an open position so that the housing can be used as a scoop. When the person lifts their thumb off the protuberance, the door will rotate back toward the housing, returning to the closed position. This device is suitable for picking up pet waste that is laying on grass or a sidewalk for instance, but is not suitable for sifting animal waste from a litter box as there is no way for clean litter (i.e. litter free of clumps containing pet waste) to be returned from the housing to the litter box. The device also has another problem in that it really is only suitable for one attempt at picking up the pet waste. This is because there will be a tendency for captured waste to slide back out of the housing when the housing is tipped into the appropriate position for scooping up waste. This tendency is enhanced by the gently angled front wall that is used as the scoop.

Melitta Zentralgesellschaft mbH & Co. KG, a German corporation, operating under the trade name Swirl® discloses on its website a scoop for a litter box that includes a scoop portion and a receptacle portion. The scoop portion includes a handle and a grate. The scoop is used to remove pet waste from a litter box and the grate permits clean litter to be returned to the box while capturing the waste on the grate. The device is turned to a generally vertical orientation to drop captured waste into the receptacle. One of the issues with this device is that if it takes several scoops to remove all the pet waste from the litter box, each time the scoop is tipped to introduce its leading edge into the litter, there is a tendency for already captured waste to slide out of the receptacle, back down the scoop and back into the litter box. When it is desired to remove the waste from the device, the receptacle is detached from the scoop and is tipped upside-down to drop the captured waste into the garbage. It is not really necessary to detach the receptacle from the scoop in order to do this because the entire device can be tipped upside down to cause the captured waste to slide out of the receptacle. A further issue with this product is that the scoop is rounded at the front, making it quite difficult to remove waste from all regions of litter boxes as the boxes tend to be generally rectangular in shape, having vertical exterior walls and right-angled corners. Additionally, the scoop has generally non-existent side walls which will permit waste on the grate to drop back into the litter box. This system also does not easily accommodate a bag since the scoop twists onto the container like a bottle top that could rip or tear the bag during use.

SUMMARY

While all of these aforementioned devices function reasonably well for the purposes for which they were intended, there is still a need in the art for an improved pet waste scoop that addresses some of the shortcomings identified above. The pet scoop assembly disclosed herein does exactly that.

The disclosed pet scoop assembly includes a scoop member; a receptacle detachably engageable with the scoop member; and a door disposed intermediate the two. A disposable bag may line the receptacle and be held in place between the receptacle and scoop member. The door is positioned to open inwardly into the receptacle. When the scoop assembly is turned into a vertical orientation the door opens by gravity or by the weight of gathered pet waste sliding onto the door. A region of the scoop member adjacent the door is angled to allow pet waste to slide readily from the scoop member into the receptacle. In a variation, the scoop member is provided with a plurality of tines that enable pet waste to be removed from surfaces such as grass. An elongate handle is provided on this scoop to allow the user to stand upright during use.

In a first aspect the invention may provide a pet scoop assembly comprising: a scoop member; a receptacle engageable with the scoop member; and a door disposed intermediate the scoop member and receptacle.

In a second aspect the invention may provide a pet scoop assembly comprising a scoop member; a receptacle engageable with the scoop member; a bag receivable in the receptacle; a door provided at one end of the receptacle adjacent the scoop member; and a handle on one of the scoop assembly or the receptacle.

In another aspect the invention may provide a pet scoop assembly comprising a scoop member; a receptacle engageable with the scoop member; and a door disposed intermediate the scoop member and receptacle and being pivotable between an open and closed position; wherein the door has a top end and a bottom end and the top end is of a first thickness and the bottom end is of a second thickness; and wherein the second thickness is greater than the first thickness.

In another aspect the invention may provide a pet scoop assembly comprising a scoop member having a frame with a front region extending forwardly therefrom; a receptacle member having a bottom wall and a peripheral wall extending upwardly and outwardly from the bottom wall; said peripheral wall terminating in an outer end; and wherein a cavity is bounded and defined by the bottom wall and the peripheral wall and an opening to the cavity is bounded and defined by the outer end of the peripheral wall; and wherein the frame of the scoop member detachably engages the outer end of the peripheral wall; and wherein the front region of the scoop member is dimensioned to be insertable through the opening and into the cavity when the scoop member is detached from the receptacle member.

In another aspect the invention may provide a method of removing pet waste from a litter box comprising providing a scoop assembly having a scoop member; a receptacle detachably engageable with the scoop member; and a door disposed intermediate the scoop member and receptacle, said door being movable between an open and closed position; detaching the scoop member from the receptacle; inserting a disposable bag through an opening defined by an outer end of the receptacle and into a cavity defined in the receptacle; folding an upper end of the bag over the outer end of the receptacle; re-engaging the scoop member with the receptacle; trapping the bag between the scoop member and the receptacle in an open position; inserting a front end of the scoop member into pet litter in the litter box; rotating the scoop assembly from a horizontal orientation toward a vertical orientation; pivoting the door to the open position as the scoop assembly is rotated; and sliding captured pet waste down the scoop member and into the held-open bag.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

FIG. 4 is a longitudinal cross-sectional view of the pet waste scoop assembly;

FIG. 17 is a front perspective view of an alternative embodiment of a pet waste scoop assembly useful for removing pet waste from surfaces such as grass.

Similar numbers refer to similar parts throughout the drawings.

DETAILED DESCRIPTION

Figure 1:
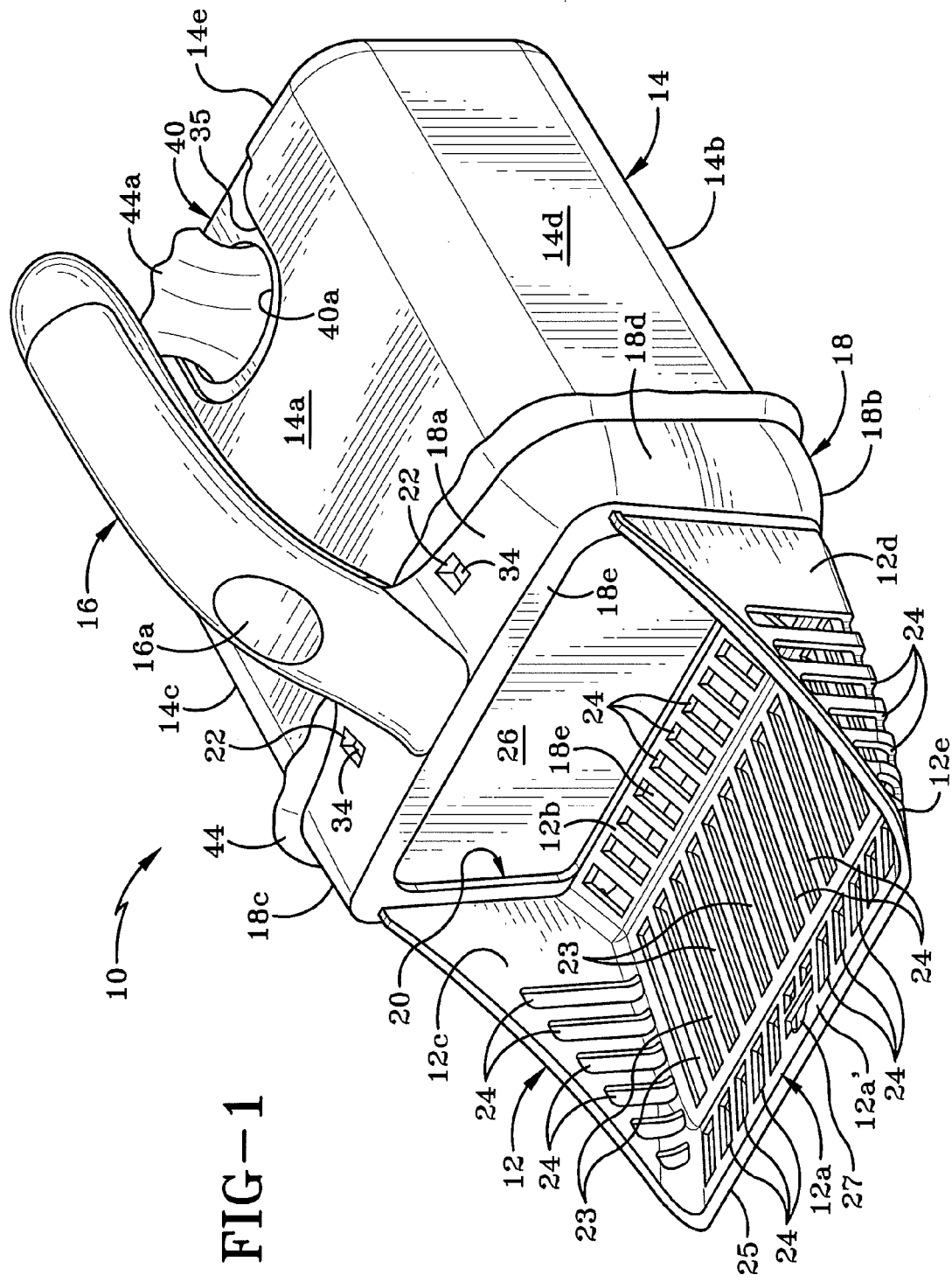
FIG. 1 is a front perspective view of a pet waste scoop assembly.

Referring to FIGS. 1-9, there is shown a pet scoop assembly, generally indicated at 10. Scoop assembly 10 includes a scoop member 12 and a receptacle 14 which are selectively engageable with each other. Assembly 10 further includes a handle 16.

Handle 16 extends upwardly and outwardly from scoop 12. Handle 16 is thus illustrated as forming part of scoop member 12 but it will be understood that handle 16 may, instead, form part of receptacle 14 or be provided on a separate frame member that may be disposed between scoop member 12 and receptacle 14. Additionally, handle 16 is shown as being an integral part of scoop member 12 but it will be understood that handle 16 may, instead, be a separate component that is selectively detachably engaged with scoop member 12. Similarly, if handle 16 is part of receptacle 14 or a separate frame member disposed between scoop 12 and receptacle 14, then handle 16 may be detachably engageable with the associated one of the receptacle or the separate frame member. Furthermore, handle 16 may itself be a single unitary component or handle 16 may be comprised of two or more individual components that are secured together in a suitable manner to form the handle. Additionally, the underside of handle 16, i.e., the surface of handle 16 disposed adjacent receptacle 14 may be provided with some type of gripping surface or texturing to aid a user in holding on to handle 16. Handle 16 is further ergonomically designed so that the handle is at a comfortable angle for a user to hold and manipulate and so that handle 16 is easy to grip. It should be understood that the exact configuration of handle 16 is not limited to the specific design shown in the attached figures but any ergonomically shaped handle that is disposed spaced apart from and generally parallel to a first wall 14*a* of receptacle 14 is most desirable. Handle 16 may include a thumb rest 16*a* for seating of a user's thumb therein during operation of scoop assembly 10.

Scoop member 12 includes a frame 18 which may be generally rectangular in cross-section, although other shapes are possible. Frame 18 of scoop member 12 detachably engages an upper end of receptacle 14. Frame 18 includes a first wall 18*a*; a second wall 18*b*, a third wall 18*c*, a fourth wall 18*d*, and a fifth wall 18*e*. All of the walls 18*a*-18*e* are integrally formed with each other to form a unitary member. Walls 18*a*-18*e* bound and define an opening 20, the purpose of which will be further described herein. One or more apertures 22 are defined in at least each of first wall 18*a* and second wall 18*b*. Apertures 22 may additionally or alternatively be defined in third and fourth walls 18*c*, 18*d*. Apertures 22 are provided for interlocking engagement with complementary protrusions 34 on receptacle 14, as will be later described herein. It will be understood that instead of apertures 22 being defined in first and second walls 18*a*, 18*b*, depressions could be formed therein to interlockingly engage protrusions 34 on receptacle 14. Still further, the protrusions 34 could be provided on scoop member 12 and the associated and complementary apertures 22 or depressions could be defined in receptacle 14, or a combination of complementary receptacles and protrusions could be provided on each of scoop member 12 and receptacle 14.

While frame 18 is illustrated and described herein as forming an integral part of scoop member 12, it should be understood that frame 18 may, alternatively form part of receptacle 14. Still further, as discussed earlier herein, frame 18 may comprise an independent frame member that is an independent component positioned between scoop member 12 and receptacle 14 and be detachably engaged with each of scoop member 12 and receptacle 14. In this latter instance, frame 18 could releasably be engaged with scoop member 12 in much the same manner as it currently illustrated and described as being releasably engaged with receptacle 14.

Scoop member 12 includes a front region which extends outwardly and forwardly from frame 18. This front region includes a bottom wall and side walls. Bottom wall, which includes a first section 12*b*, a second section 12*a* and a third section 12*a*', extends forwardly from fifth wall 18*e* of frame 18. (Third section 12*a*' may be provided with one or more holes 27 which may be utilized to suspend scoop assembly 10 from a hook mounted on a wall.) Side walls 12*c*, 12*d* extend forwardly from sections 18*c* and 18*d* of frame and further extend upwardly and outwardly away from the outer edges of third, second and first sections 12*a*', 12*a*, 12*b* of the bottom wall and generally at right angles thereto. It will be understood that while side walls 12*c*, 12*d* are illustrated herein as being disposed generally at right angles to the bottom wall sections 12*a*', 12*a*, 12*b*, they may also flare slightly outwardly away from bottom wall when scoop member 12 is viewed from a front end.

Scoop member 12 includes an outer rim 25. Third section 12*a*' of the bottom wall originates at rim 25 and extends for a distance inwardly therefrom. Rim 25 has an angled profile (FIG. 4) to make it suitable for scraping. Rim 25 is also stiffened or hardened so that it is not easily damaged during use and so that it is strong enough to move readily and easily through litter material 46 (FIG. 10) in a litter box 48. Rim 25 needs to be sufficiently rigid and strong enough to scrape waste material 47 off the bottom or sides of litter box 48 or to travel across surfaces such as grass or cement. Second section 12*a* of the bottom wall originates at a rearward region of third section 12*a*' and extends inwardly to a forwardmost region of first section 12*b*. First section 12*b* terminates proximate wall 18*e* of frame 18. Second and first sections 12*a*, 12*b* are disposed at a first angle of from about 130° up to about 135° relative to each other. This first angle is represented by the reference character a in FIG. 4. Third section 12*a*' is disposed at a second angle $\beta$ relative to second section 12*a*, and angle $\beta$ is from about 150° up to about 160°. Furthermore, when scoop member 12 and receptacle 14 are engaged with each other, second section 12*a* is disposed at an angle of from about 145° up to about 160° relative to the second wall 14*b* of receptacle 14; and first section 12*b* is disposed at an angle of from about 25° up to about 35° relative to second wall 14*b* of receptacle 14. The corners 12*e* of scoop member 12 are gently curved.

These curved corners 12e help scoop assembly 10 reach into corners of litter box 48, as will be later described herein. The bottom wall 12a', 12a, 12b and side walls 12c, 12d may be integrally formed with frame 18.

The configuration of the bottom wall of scoop member 12 is such that litter material 46 with clumped pet waste 47 therein is scooped onto third section 12a'. The litter material 46 and clumped pet waste 47 slides down third section 12a' and onto second section 12a. Litter material 46 and pet waste 47 will tend to become initially retained in the V-shaped region between second and first sections 12a, 12b. When scoop assembly 10 is moved from a horizontal orientation (FIG. 4) toward a vertical orientation (FIG. 13), as will be later described herein, the clumped pet waste 47 slides onto first section 12b. The angle of first section 12b is such that when the entire scoop assembly 10 is further moved into a vertical orientation, the pet waste 47 will tend to slide down the surface of first section 12b toward opening 20 and subsequently into receptacle 14. This will be described in greater detail later herein.

Bottom wall sections 12a', 12a, 12b of scoop 12 includes a plurality of tines 23 which are separated from each other by a plurality of apertures 24. Apertures 24 are provided so that un-clumped and uncontaminated pet litter is able to be separated from clumped and contaminated pet litter and be subsequently dropped through apertures 24 and back into a litter box, as will be hereinafter described. Side walls 12c, 12d are also provided with a plurality of apertures 24 for a similar reason, although it will be understood that side walls 12c, 12d may be free of such apertures 24. Any desired pattern of apertures 24 and tines 23 may be utilized in bottom wall sections 12a', 12a, 12b and side walls 12c, 12d to provide a grate-like surface which will capture larger materials and allow smaller materials to pass therethrough.

Figure 4A:
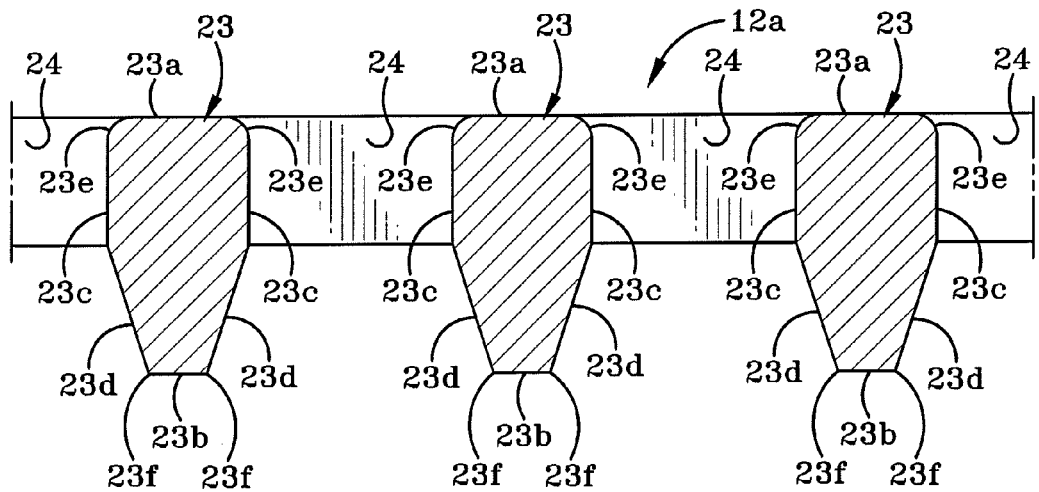
FIG. 4A is a cross-section through a group of tines taken along line 4A-4A of FIG. 4.

Referring to FIG. 4A, each tine 23 includes an upper surface 23a, a lower surface 23b, first side surfaces 23c, and second side surfaces 23d. First side surfaces 23c are oriented opposite and generally parallel to each other. Second side surfaces are oriented opposite each other and at an angle relative to each other. Each tine 23 tapers from an end region of first side surfaces 23c to the lower surface 23b. Rounded corners 23e are provided between upper surface 23a and each of the first and second side surfaces 23c, 23d. The radius of curvature of corners 23e may be around 0.25 mm. First side surfaces 23c angle downwardly from the associated corner 23e and connect to second side surfaces 23d which then each connect to lower surface 23b at a corner 23f. Each of the first side surfaces 23c originates about 0.5 mm downwardly from upper surface 23a. Each second side surface 23d may be at an angle of about 165° relative to lower surface 23b. Overall, tine 23 tapers from upper surface 23a to the lower surface 23b. This configuration of tine 23 has been found to work well for removing clumped litter material from litter boxes 48. The apertures 24 permit unclumped litter material 46 to fall back into litter box 48. Litter material that clumps around feces does not tend to break apart when scoop assembly 10 is shaken in order to cause un-clumped litter material 46 to drop through apertures 24 and back into litter box 48. However, litter material that clumps around urine tends to form clumps that are quite fragile and tend to break apart relatively easily. The cross-sectional shape of tine 23 (shown in FIG. 4A) has been found to be suitable to help maintain the integrity of these fragile clumps and will at least somewhat reduce the tendency of the clumps to break apart and fall back into the litter box 48. If broken-apart clumped litter material is returned to litter box 48, cats will tend to avoid using the litter box because of the smell emanating from the small particles of litter material containing urine and/or feces. Utilizing the shape of tine 23 shown in FIG. 4A will therefore aid in prolonging the time that litter material can be used. It will, of course, be understood that tines having a different cross-sectional shape may be used in the scoop assembly 10 instead of the tines 23 illustrated herein.

Figure 2:
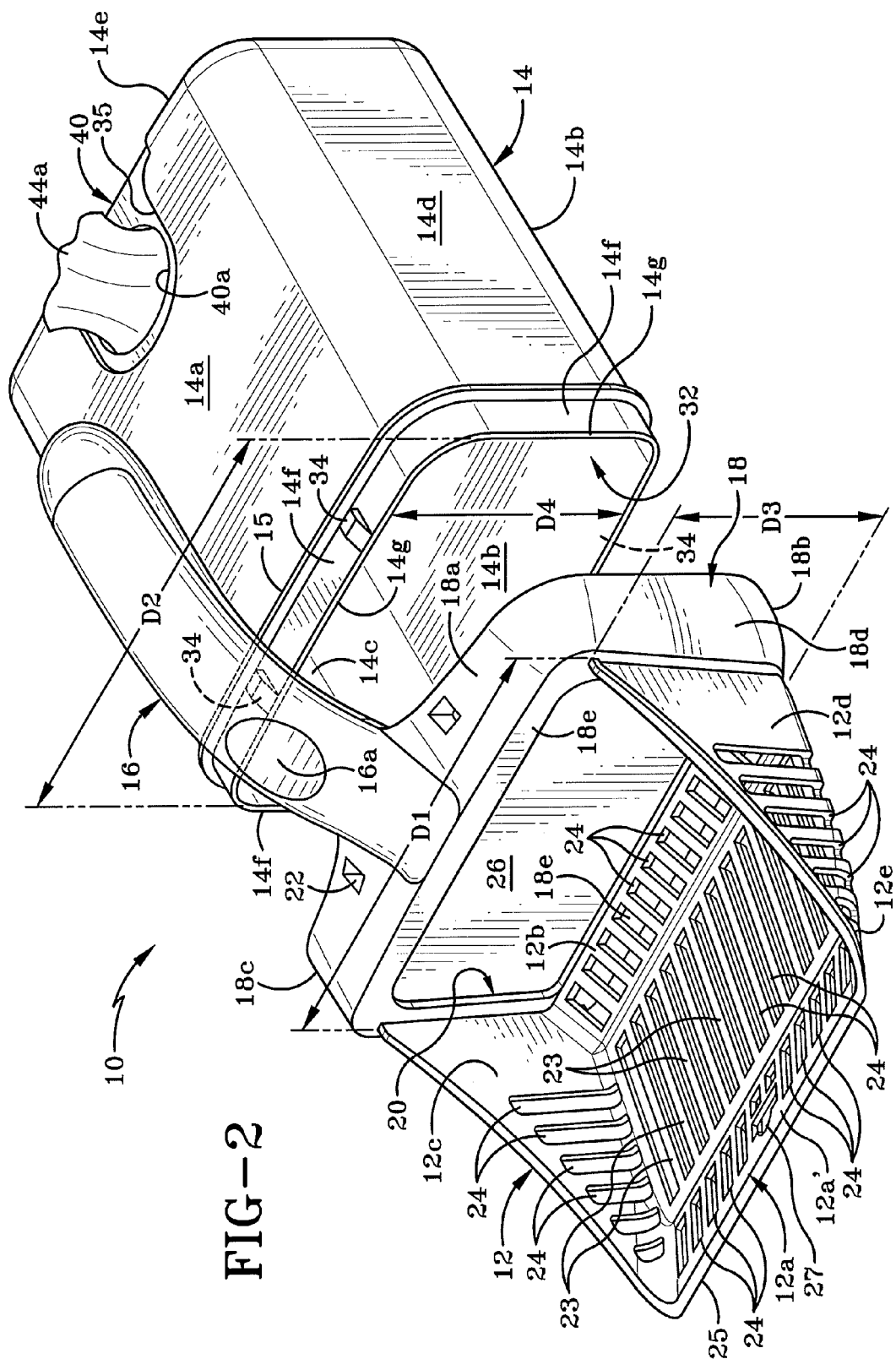
FIG. 2 is an exploded front perspective view of the scoop assembly of FIG. 1.
Figure 3:
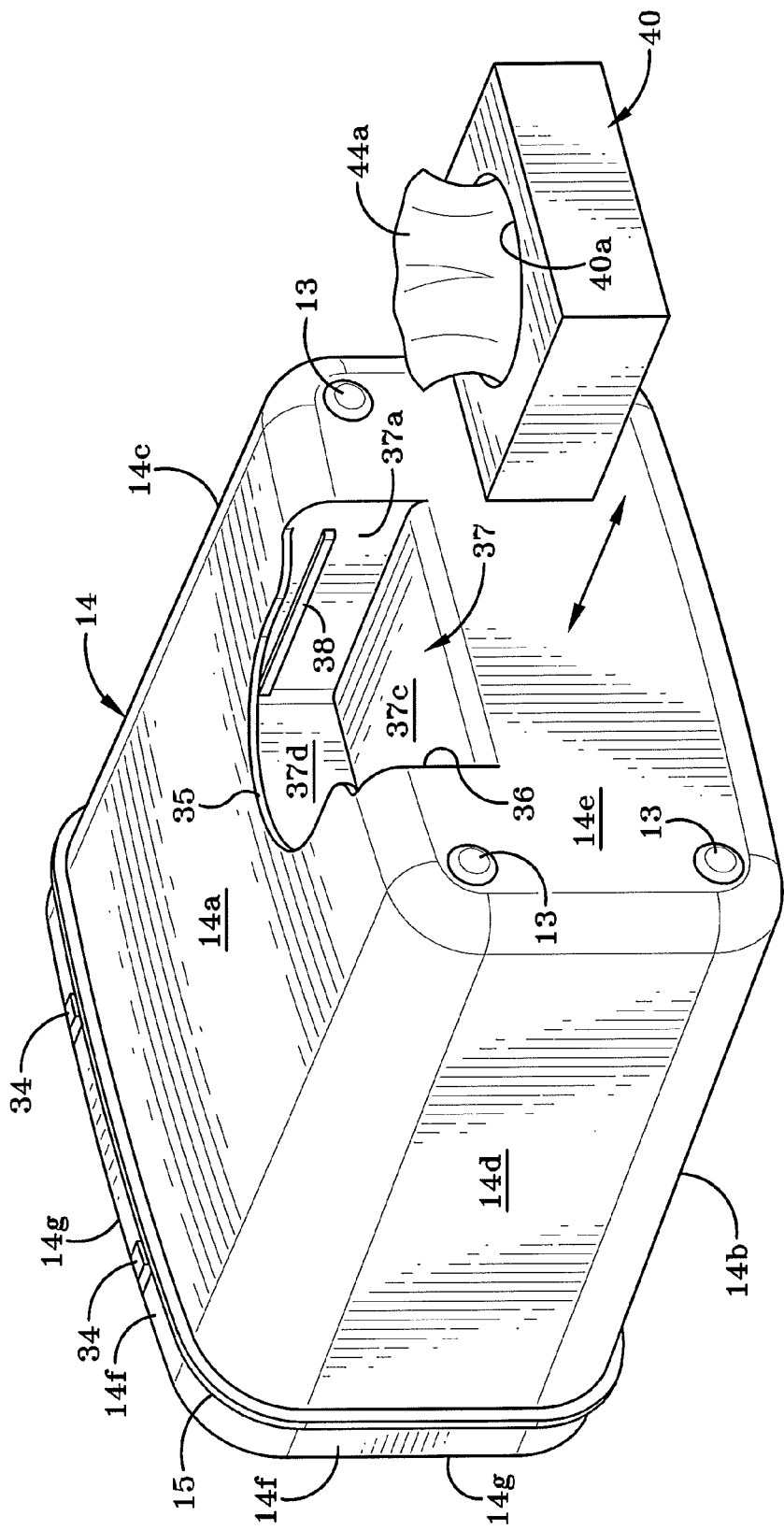
FIG. 3 is a rear perspective view of the receptacle of the scoop assembly.
Figure 15:
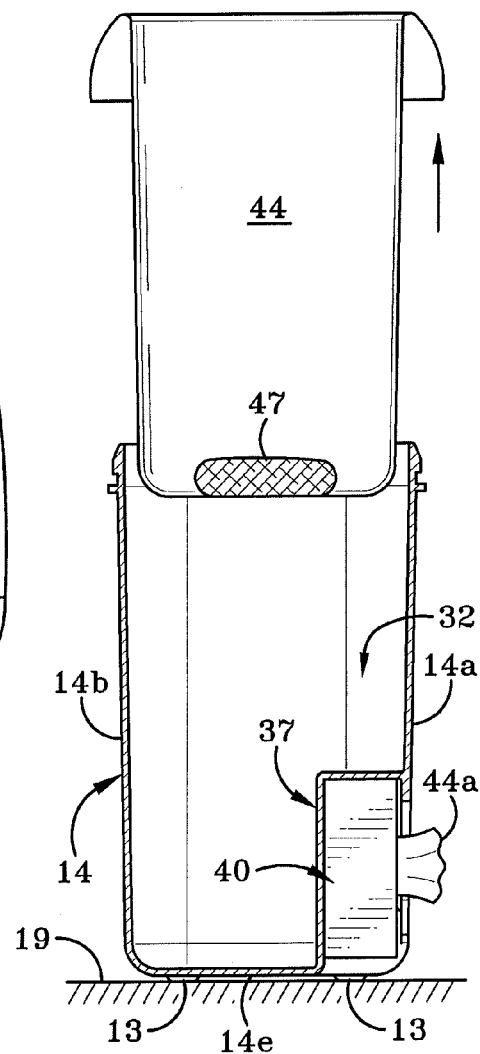
FIG. 15 is a cross-sectional side view of the scoop assembly showing the bag being removed from the receptacle.

Receptacle 14 is shown in greater detail in FIGS. 2 and 3. Receptacle 14 includes a peripheral wall comprised of a first wall 14a, a second wall 14b, a third wall 14c, and a fourth wall 14d. This peripheral wall extends outwardly away from a fifth wall 14e. First wall 14a may be referred to herein as the upper wall and second wall 14b may be referred to as the lower wall of receptacle 14. This is because second wall 14b will be adjacent to a surface upon which pet waste 47 rests when scoop assembly 10 is oriented in a horizontal position in order to lift that pet waste from the surface. A plurality of feet 13 is provided on fifth wall 14e. Feet 13 will support receptacle 14 a short distance above a surface 19 when receptacle 14 is moved to a vertical orientation (FIG. 15) and is placed on surface 19.

Receptacle 14 may be a rectangular cube in shape, although any other desired shape could be utilized provided that receptacle 14 and scoop member 12 are complementary so they may be engaged together. Peripheral wall 14a-14d and fifth or bottom wall 14e bound and define a cavity 32 (FIG. 2). The outer edges of walls 14a-14d remote from fifth wall 14e bound and define an opening to cavity 32. A region of each wall 14a-14d inward of the outer edge is recessed so as to form a lip 14f. Lip 14f is provided at the outer end of receptacle 14 and is shaped and sized to be complementary to and detachably engageable with walls 18a-18d of frame 18.

Figure 5:
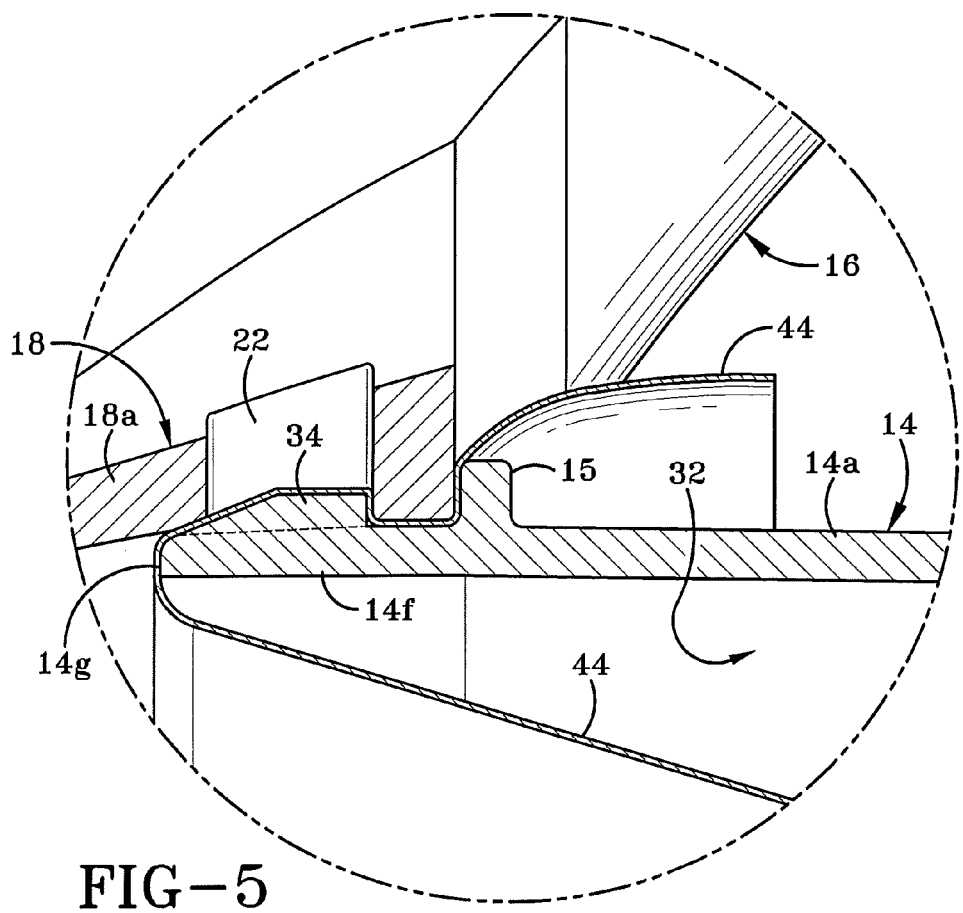
FIG. 5 is an enlarged view of the first highlighted region of FIG. 4.

As previously described, scoop assembly 10 includes some type of locking or latching mechanism for detachably securing scoop member 12 and receptacle 14 together. As illustrated in FIG. 5, one suitable locking or latching mechanism comprises one or more protrusions 34 provided on the exterior surface of lip 14f and mating apertures 22 defined in frame 18. Protrusions may be integrally molded with receptacle 14 and are not movable relative thereto. (It will be understood that protrusions 34 may, instead, be provided on scoop member 12 and apertures 22 defined in receptacle 14.) Protrusions 34 are selectively receivable in the apertures 22 on frame 18 to retain receptacle 14 and scoop member 12 together. Additionally a ridge 15 (FIG. 5) extends outwardly from the exterior surface of walls 14a, 14b, 14c, and 14d of receptacle 14. Ridge 15 abuts the outermost edge of scoop member 12 and acts as a stop, thereby limiting the inward travel of scoop member 12 when scoop member 12 and receptacle are engaged with each other.

Scoop assembly 10 further includes a door 26 which separates scoop member 12 from receptacle 14. Door 26 may be provided on scoop member 12 as shown herein but may, alternatively, be provided on receptacle 14 in a position which will place door 26 between scoop member 12 and receptacle 14.

Door 26 comprises a planar sheet of material, such as plastic. This sheet of material is generally rectangular in shape so that door 26 is complementary to opening 20 defined in scoop 12. An upper end 26a of door 26 may be secured to frame 18 by a hinge as will be described below. A lower end 26b of door 26 is spaced a distance from upper end 26a and extends for a short distance below a bottom end of opening 20. In accordance with an aspect of the invention, the upper end 26a of door is of a first thickness "T1" (FIG. 4) and the lower end 26b of door is of a second thickness "T2". The second thickness "T2" is greater than the first thickness "T1" so that door 26 tapers from lower end 26b toward top end 26a. This change in thickness causes door 26 to be slightly weighted at its lower end 26b. The additional weight helps ensure that door 26 will move from an open position to a closed position quickly and easily. The additional weight on lower end 26b also aids in ensuring that door 26 will completely close off opening 20.

Door 26 may, alternatively, be of a relatively constant thickness from its top end 26a to its bottom end 26b. However, if door 26 is of substantially the same thickness from top end 26a to bottom end 26b thereof, door 26 may not move to the completely closed position and may not stay shut. Door 26 may also take longer to move from the open position to the closed position. In order to address this issue, door 26 may be weighted in another manner such as by securing one or more weighted strips proximate bottom end 26b. It is, however, cheaper and simpler to taper the door 26 in the manner described above.

Figure 6:
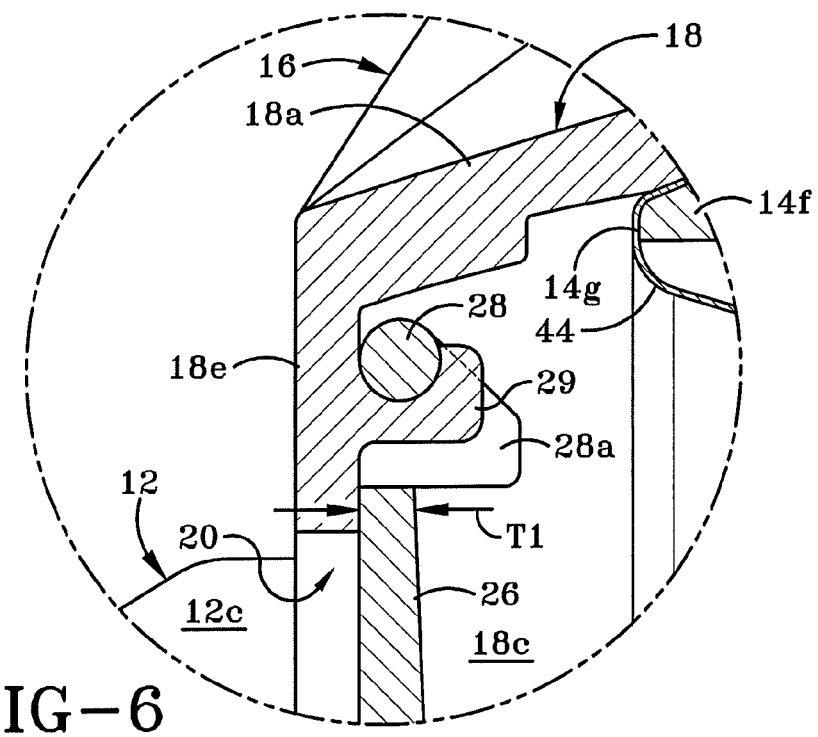
FIG. 6 is an enlarged view of the second highlighted region of FIG. 4 showing a first way in which the door is secured to the frame.
Figure 7:
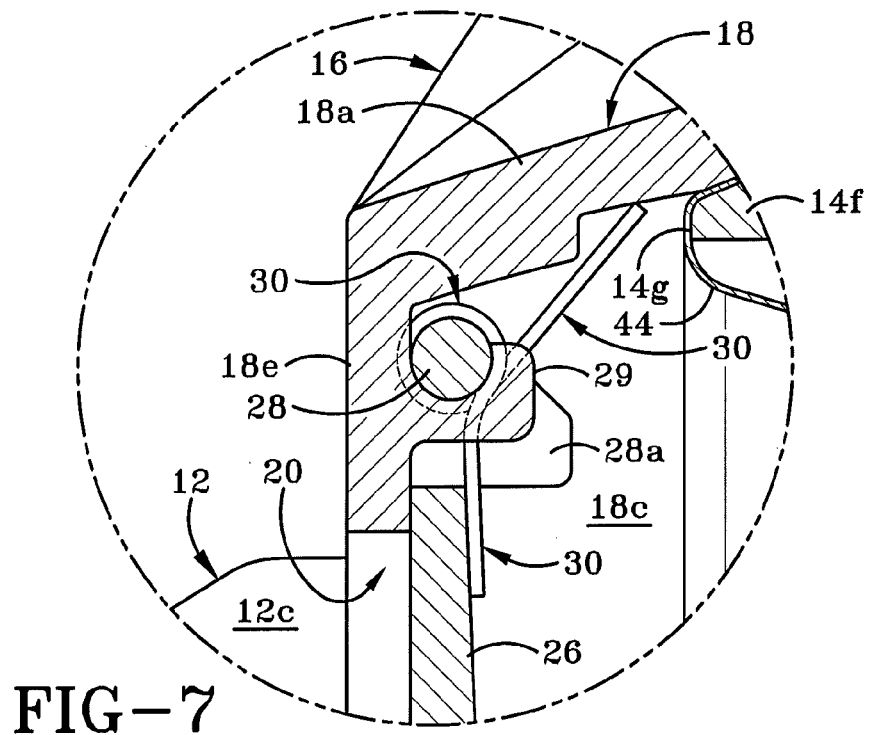
FIG. 7 is an enlarged view of the second highlighted region of FIG. 4 showing a second way in which the door is secured to the frame.
Figure 8:
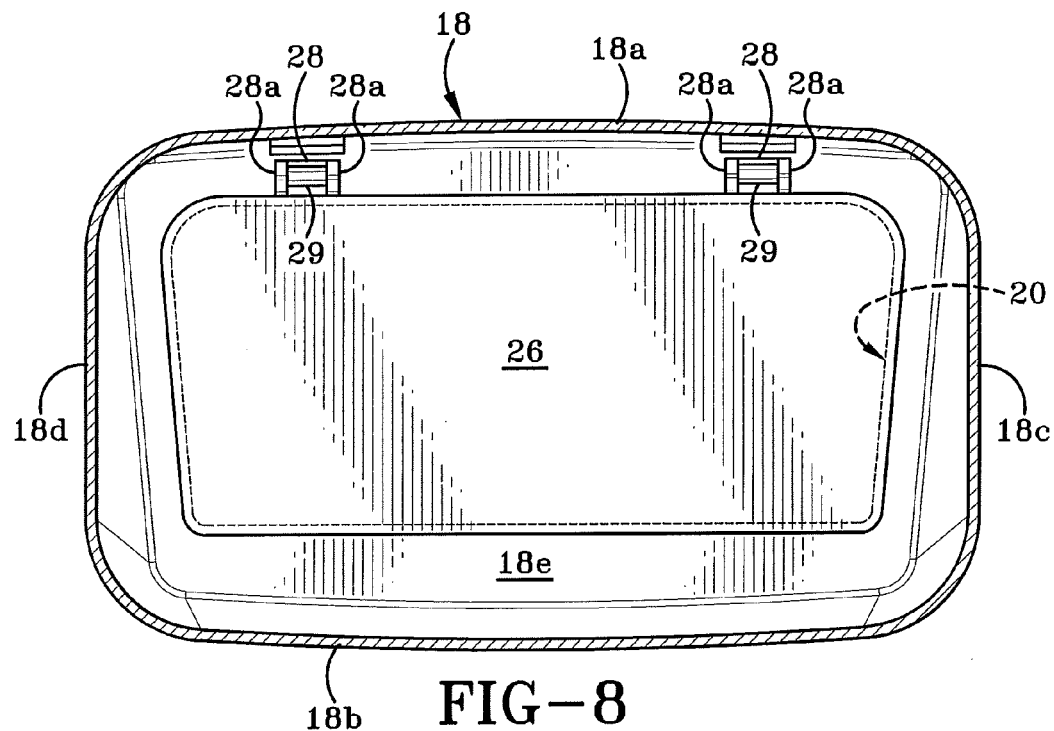
FIG. 8 is a cross-sectional rear view of the scoop assembly taken along line 8-8 of FIG. 4.
Figure 9:
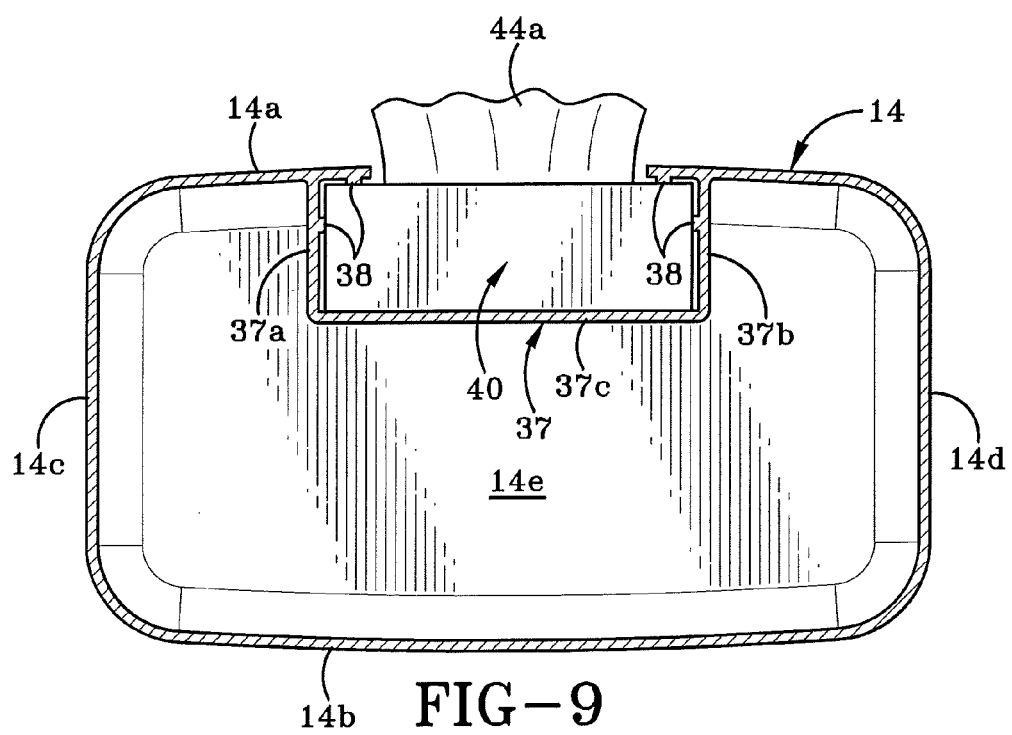
FIG. 9 is a cross-sectional front view of the scoop assembly taken along line 9-9 of FIG. 4.
Figure 13:
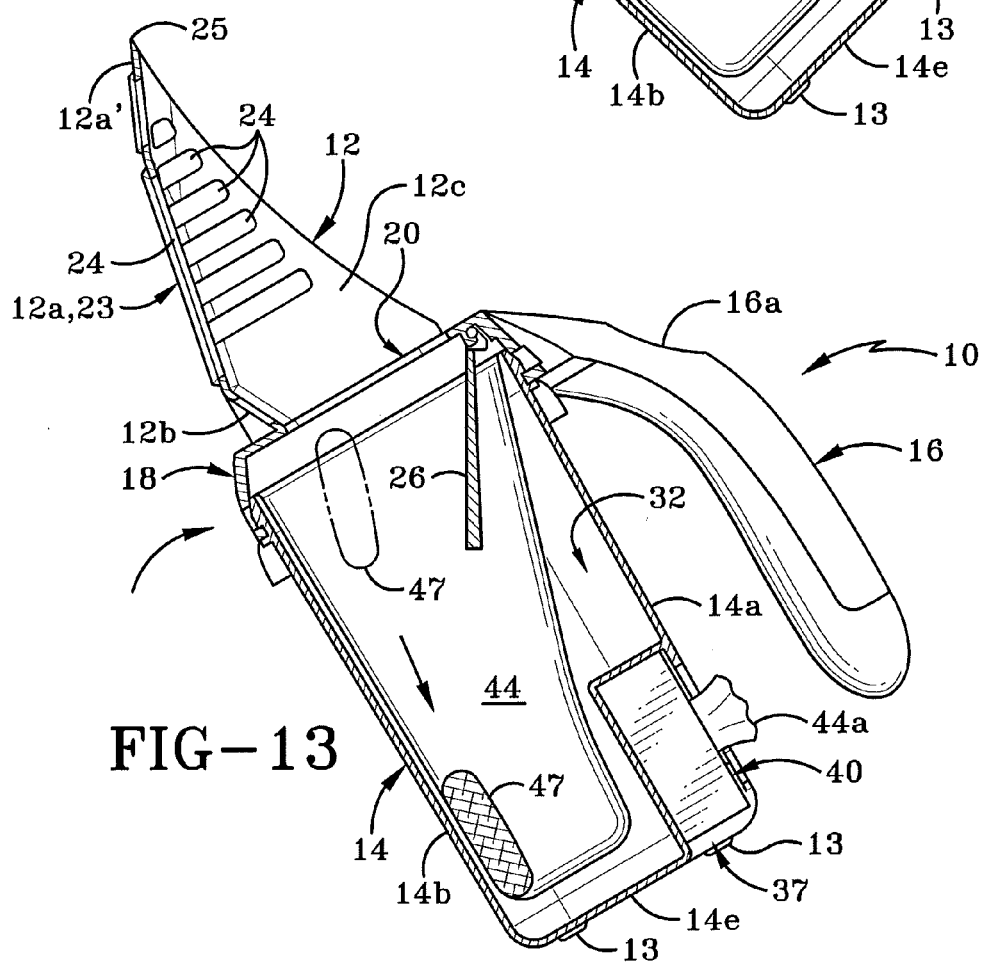
FIG. 13 is a cross-sectional side view of the scoop assembly showing the door in the fully open position and the pet waste dropping into the bag retained in the receptacle.

Door 26 may be secured to frame 18 by a hinge. The hinge may take any one of a variety of forms. For example, the hinge may be a living hinge. Alternatively, as shown in FIGS. 4, 6, and 8, a pin 28 mounted between walls 28a on a top edge of door 26 may engage one or more protuberances 29 extending outwardly from an interior surface of frame 18. Walls 28a may also act as stops to limit travel of the door 26. Still further, as shown in FIG. 7, the hinge may also further include any type of spring, such as a torsion spring 30, which urges the door 26 into a closed position. Whatever form the hinge takes, door 26 is able to move between a closed position (FIG. 4) and an open position (FIG. 13).

When scoop assembly 10 is positioned at a scooping angle, i.e., where scoop member 12 is correctly positioned to dig into litter material 46 within litter box 48; or when scoop member 12 is generally horizontal (as in FIG. 4), the door 26 is in a closed position where it shuts off opening 20. In this position, door 26 is generally at right angles to first wall 14a of receptacle. When the user is finished scooping pet waste out of litter box 48, they will turn receptacle 14 to a generally vertical position (FIG. 13). This motion will cause door 26 to pivot about an axis extending along pin 28 and move from a closed position to an open position. When door 26 is in the open position, opening 20 permits access into the interior of receptacle 14. When scoop assembly 10 is returned to a generally horizontal position, the door 26 will pivot about the axis extending through pin 28 and will return to the closed position, shutting off access to opening 20 and therefore to the interior of receptacle 14.

In the event the hinge is a spring-loaded hinge instead of one which operates under the force of gravity, door 26 will be urged by spring 30 (FIG. 7) into the closed position. When scoop assembly 10 is moved to a generally vertical orientation as shown in FIG. 13, the weight of the clumped pet waste 47 resting on door 26 will overcome the force applied by spring 30, and door 26 will swing from the closed position to the open position. As soon as waste 47 has dropped through opening 20, door 26 will swing back to its closed position as spring 30 returns to its original position and/or length depending on the type of spring used.

Receptacle 14 is configured to receive and retain a replaceable container 40 of disposable bags 44/44A therein. Bags 44/44A are retained in the container 40 in much the same way as tissues are retained in a tissue box. Container 40 is shown in FIG. 3 as being a rectangular cube in shape and includes an opening 40a defined in one surface thereof. Although not identified herein, it will be understood that container 40 defines an interior compartment in which a plurality of bags 44/44A is stored. When needed, bags 44/44A may be individually withdrawn from the interior compartment through opening 40a. When all the bags within container 40 are used, container 40 may be disengaged from receptacle 14 and thrown away. A new container 40 including a plurality of bags therein will then be engaged with receptacle 14. Since container 40 is engageable with receptacle 14, a recessed region complementary to the exterior shape of container 40 is provided in receptacle 14. To this end, receptacle 14 defines a first aperture 35 in first wall 14a and a second aperture 36 is defined in fifth wall 14e. First aperture 35 may be generally U-shaped when viewed from above and may be of a size and location that is at least slightly larger than opening 40a of container 40. Second aperture 36 is of a size and shape complementary to a side of container 40. Four walls 37a, 37b, 37c, and 37d are provided to define and surround a compartment 37 that is accessible through each of first and second aperture 35, 36. Compartment 37 is substantially complementary is size and shape to container 40. First and second apertures 35, 36 are in communication with compartment 37. Compartment 37 is separated from cavity 32 and thus cavity 32 has only one opening into the same, namely the opening defined by the lip 14f formed by outer edges of walls 14a, 14b, 14c, and 14d. The opening is positioned opposite fifth wall 14e. It will be understood that while compartment 37 and container 40 are both illustrated and described herein as being generally a rectangular cubic shape, any complementary shaped compartment and container other than ones having a rectangular cubic shape may be provided in receptacle 14.

One or more opposed ridges 38 extend inwardly into compartment 37 from first and second walls 37a, 37b. A pair of spaced apart ridges 38 extends inwardly into compartment 37 from the interior surface of first wall 14a of receptacle. Additional ridges may be provided on third wall 37c if desired. Ridges 38 are provided so as to frictionally engage the exterior surface of container 40 and thereby frictionally retain container 40 in compartment 37 when pet scoop assembly 10 is used. When container 40 is engaged in compartment 37 the receptacle 14 acts as a caddy and storage means for the bags 44 that are for later use with scoop assembly 10.

During use, a single bag 44 is withdrawn outwardly through opening 40a of container 40 and out through first aperture 35 in first wall 14a of receptacle 14. Scoop member 12 is disengaged from receptacle 14. Bag 44 is positioned within cavity 32 of receptacle 14 and then scoop member 12 is re-engaged with receptacle 14, trapping an upper edge of bag 44 between outer edge of walls 18a-18d and lip 14f. When bag 44 is so trapped, bag is held in an open position where bag 44 is substantially complementary to cavity 32 of receptacle 14. The withdrawal of bag 44 from container 40 results in a second bag 44A which is located within the container to become positioned for subsequent withdrawal therefrom. In some instances, the withdrawal of bag 44 may cause part of the second bag 44A to extend outwardly through opening 40a and first aperture 35 and thus be in a ready position for withdrawal from container 40. In other instances, the user will simply insert their fingers through opening 40a and grasp the second bag 44A and withdraw the same from container 40.

It should further be noted that bottom wall sections 12a', 12a, 12b of scoop member 12 and second wall 14b of receptacle 14 are substantially uninterrupted and free of barriers between them (apart from door 26) when receptacle 14 is engaged with scoop member 12. This ensures that when pet waste 47 is received on the bottom wall sections 12a', 12a, 12b of scoop member 12, the waste is able to readily and easily slide from bottom wall sections 12a', 12a, 12b and onto an interior surface of bag 44 resting on an interior surface of second wall 14b. The pet waste will not become hung up on little ledges or drop into depressions that are provided between the scoop member and receptacle as is the case in some prior art devices.

Figure 14:
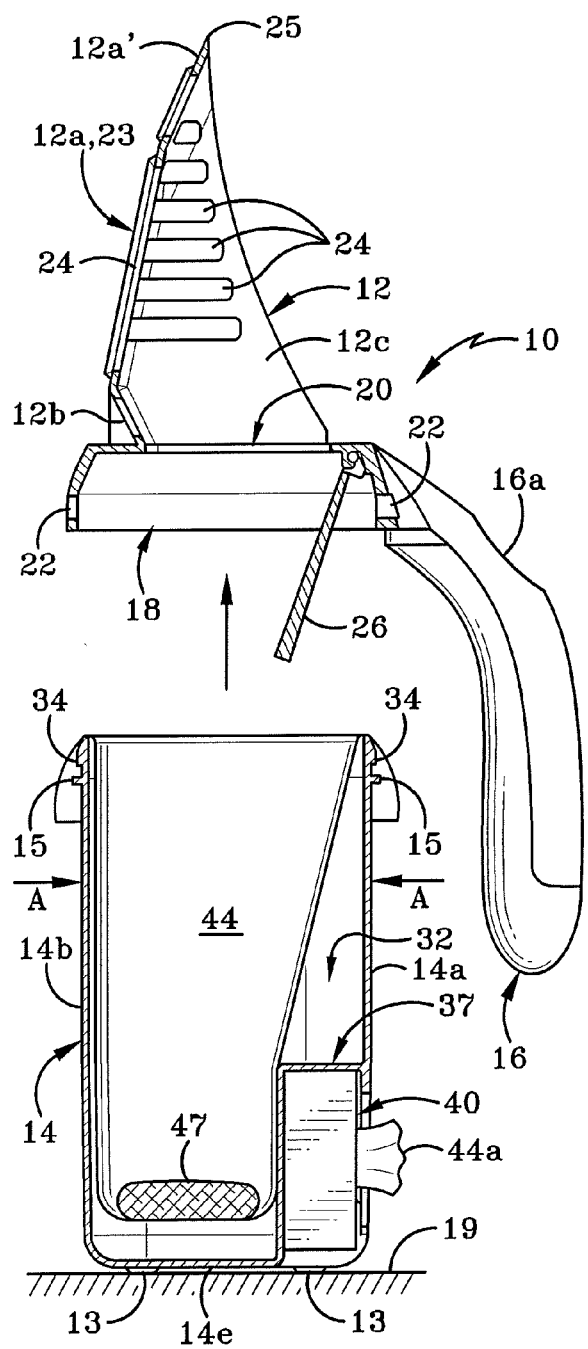
FIG. 14 is a cross-sectional side view of the scoop assembly showing the scoop member disengaged from the receptacle.

Scoop assembly 10 is used in the following manner. A bag 44 is positioned so as to line cavity 32 within receptacle 14. This is accomplished by withdrawing a bag, such as bags 44 or 44A (FIG. 1) through first aperture 35 in first wall 14a Receptacle 14 is then detached from scoop member 12 by depressing at least the first wall 14a, or the first and second walls 14a, 14b inwardly toward each other as indicated in FIG. 14 by arrows "A". This motion causes first wall 14a (and second wall 14b) to flex inwardly and causes protrusions 34 to slide out of the associated apertures 22, thereby breaking the interlocking engagement between scoop member 12 and receptacle 14. Receptacle 14 is then pulled away from scoop member 12 or vice versa from the position shown in FIG. 1 to the position shown in FIG. 2.

Bag 44 is then opened up and positioned in cavity 32 in such a way that the upper edge of bag 44 is pulled outwardly over the rim 14g (FIG. 2) of receptacle 14 and over ridge 15. Scoop member 12 is re-engaged with receptacle 14 and protrusions 34 are slid, once again into apertures 22. Movement of the scoop member 12 is arrested by ridge 15. The engagement of scoop member 12 and ridge 15 traps the upper edge of bag 44 between walls 18a-18d of scoop and lip 14f of receptacle 14, thus keeping bag 44 in an open position. Bag 44 thus effectively lines cavity 32.

Figure 10:
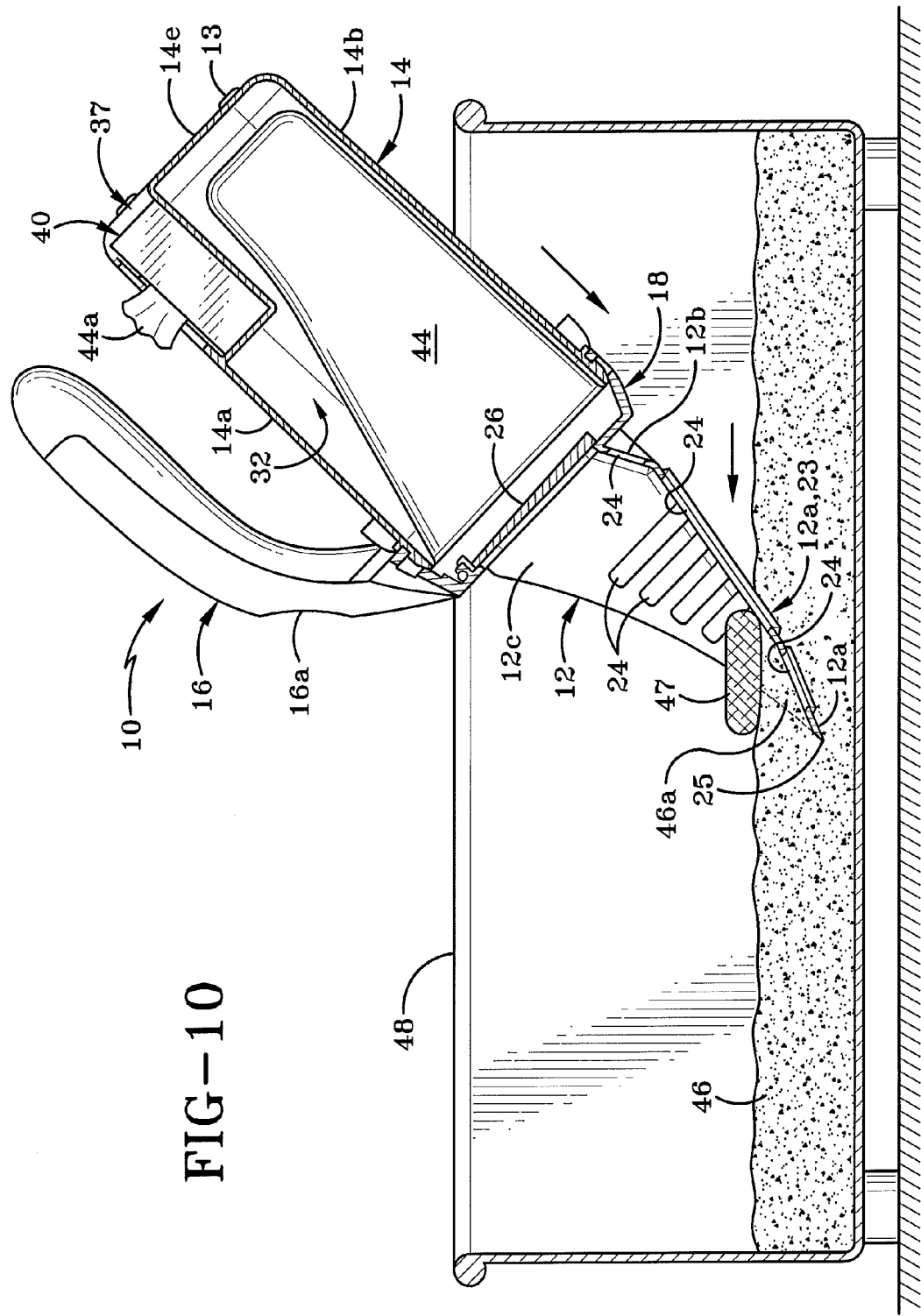
FIG. 10 is a cross-sectional side view of the scoop assembly shown in an initial position within a litter box.
Figure 11:
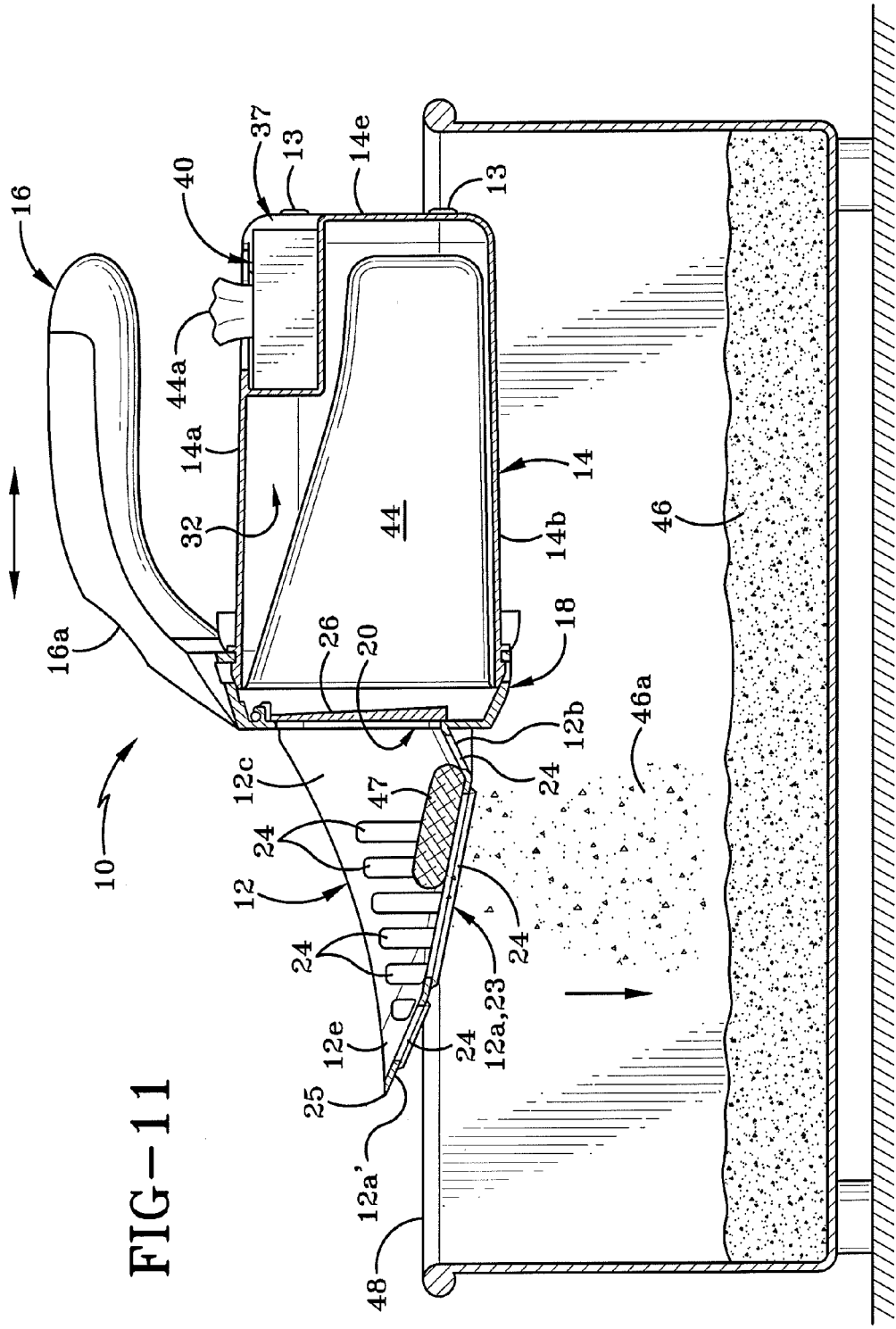
FIG. 11 is a cross-sectional side view of the scoop assembly shown in a substantially horizontal second position.
Figure 12:
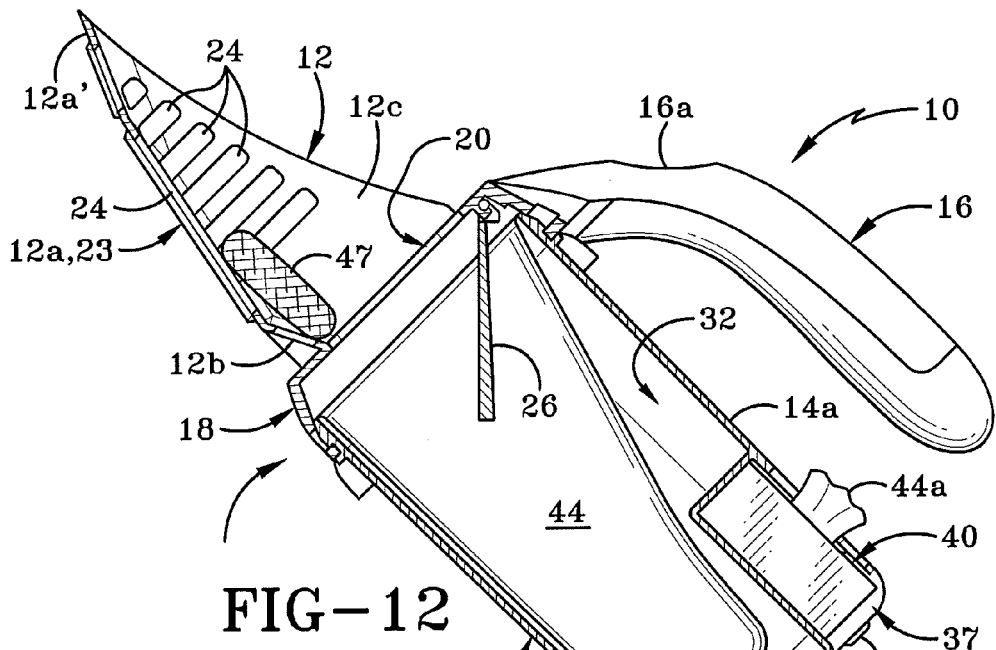
FIG. 12 is a cross-sectional side view of the scoop assembly shown in a third position with the door moving to an open position.

The user then holds handle 16 and angles scoop member 12 in the manner shown in FIG. 10 such that rim 25 of second section 12a of the bottom wall digs into litter material 46 as shown by the arrows. This causes a quantity of litter material 46 including pet waste 47 to slide onto tines 23 of third section 12a' of scoop member 12. The litter material 46 and waste 47 slides down third section 12a' and onto the second section 12a of scoop member 12. Scoop member 12 is then lightly shaken. This motion causes un-clumped litter material 46 to drop back into litter box 48 through apertures 24 (FIG. 11). Clumped litter material 47, which includes pet waste, remains on second section 12a of scoop member 12. Scoop assembly 10 is then moved from a generally horizontal orientation to a generally vertical orientation (see FIGS. 12 and 13). The clumped litter material 47 slides from second section 12a onto the first section 12b of the bottom wall, and toward opening 20. If door 26 is secured to frame 18 by a living hinge or by pin 28, the movement of the scoop assembly 10 from a horizontal position to a vertical position will cause door 26 to begin to swing into an open position. As scoop assembly 10 is moved into the vertical position, clumped pet waste material 47 slides off first section 12b, drops through opening 20 and into bag 44.

Because door 26 opens through action of gravity, door 26 remains in the open position until the orientation of scoop assembly 10 is changed. If door 26 is secured by a spring-loaded hinge 28/30 (FIG. 7) to frame 18, then the weight of clumped litter material 47 sliding onto door 26 will cause door 26 to open to a degree sufficient to allow clumped material 47 to drop through opening 20 and into bag 44. Door 26 will then swing back to the closed position under force of the spring 30 returning to its at-rest position. If the user wishes to scoop additional clumped material 47 from litter box 48, they reorient scoop assembly 10 into a horizontal position. If the door 26 closes through the action of gravity, this movement from vertical to horizontal will cause door 26 to swing closed. Thus, door 26 is in the closed position when the next scoop of litter material 46 is taken from litter box 48. The previously scooped clumped material 47 is therefore safely retained within bag 44 and receptacle 14 by the closed door 26.

When the user is finished scooping clumped litter material 47 from litter box 48, receptacle 14 is disengaged from scoop member 12 in the manner previously described, the bag 44 is withdrawn from cavity 32, and the top of the bag 44 is tied closed. Bag 44 is then pulled out of cavity 32 and is thrown away. Alternatively, the entire receptacle 14 may be tipped upside down so that bag 44 with clumped litter material 47 slides out of cavity 32 and into the garbage. A new bag 44A is then pulled out of opening 40a in container 40 and that replacement bag 44A is positioned in cavity 32 as previously described with reference to bag 44. Receptacle 14 is engaged once again with scoop member 12 trapping the bag 44A in the open position within cavity 32 so that the scoop assembly 10 is ready for its next use.

Figure 16:
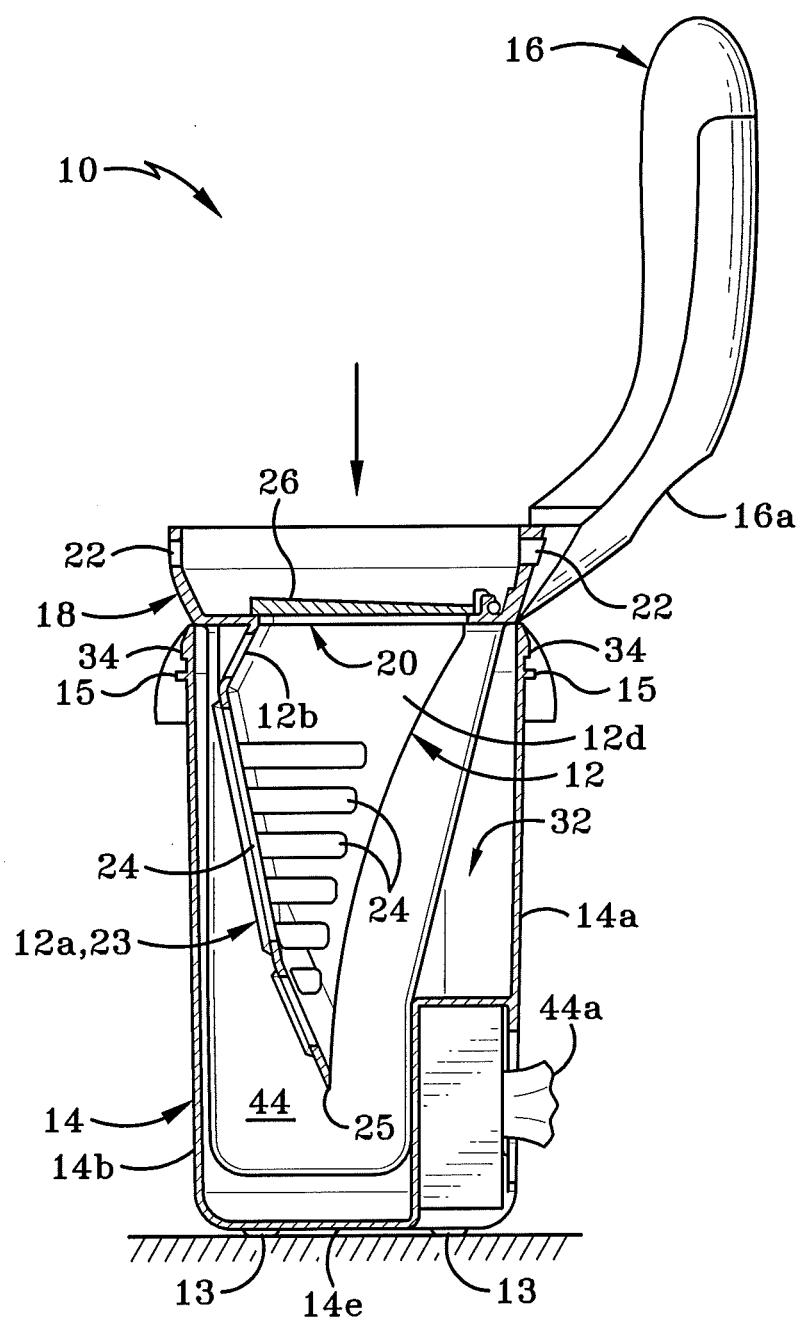
FIG. 16 is a cross-sectional side view of the scoop assembly showing the scoop member disengaged from the receptacle, with the scoop member inverted and inserted into the cavity of the receptacle for storage purposes.

FIG. 16 shows a storage position for scoop assembly 10 where scoop member 12 is detached from receptacle 14 and has been inverted and inserted into cavity 32. In order for this to be accomplished, scoop member 12 has to be dimensioned in such a way that at least the front region of scoop member is insertable through the opening defined by upper end (lip 14f) of receptacle 14. In particular, the distance "D1" (FIG. 2) between the outside surfaces of side walls 12c and 12d is less than the distance "D2" between the interior regions of the lip 14f provided at outer ends of side walls 14c and 14d of receptacle. Additionally, the distance "D3" between the lowermost region of bottom wall sections 12a, 12b and the uppermost edges of side walls 12c, 12d is less than the distance "D4" between the interior surfaces of the lip 14f on first wall 14a and second wall 14b of receptacle. When front region of scoop member 12 is inserted into cavity 32, most or all of frame 18 and all of handle 16 do not pass through the opening to cavity 32. This ensures that the user will be able to grasp handle 16 and, by manipulating handle 16, re-engage scoop member 12 and receptacle 14 without touching the front region of scoop member. Inverting scoop member 12 as illustrated in FIG. 16 and inserting the front region thereof into cavity 32, ensures that the possibility for contaminating other surfaces in the home with the front region is greatly diminished.

Receptacle 14 may be stored in an upright orientation by placing feet 13 on fifth wall 14e in contact with a flat surface. While scoop member 12 may be left engaged with receptacle 14 and then receptacle be placed feet 13 first on the flat surface for storage, it is preferable to disengage scoop member 12 from receptacle and then store the scoop assembly 10 in the position shown in FIG. 16. Receptacle 14 holds and retains scoop member 12 off the floor in either orientation i.e., with receptacle 14 standing on its feet 13 on the ground or when scoop member 12 received in cavity 32.

FIG. 17 shows an alternative version of a scoop assembly, generally indicated at 110. Scoop assembly 110 is configured to be most useful for picking up pet waste resting on a surface such as grass. Scoop assembly 110 includes a receptacle 114 that may be substantially identical in structure and function to receptacle 14. Receptacle 114 may be larger than receptacle 14. Scoop assembly 110 may include a modified scoop member 112 that is detachably engageable with receptacle 114 in much the same manner as scoop member 12 engages receptacle 14.

Scoop assembly 110 may differ from scoop assembly 10 in that instead of a container 40 of bags 44 engaged in a recessed region or compartment 37 in receptacle 14, a roll of bags (not shown), such as bag 44*b* may be storable within the interior cavity of the receptacle or within a separate compartment provided therein. A hole 135 is defined in the wall 114*a* of receptacle. A single bag 44*b* is withdrawn from the roll of bags through hole 135, is opened up and is secured within a cavity defined in receptacle 114 in substantially the same manner as described with reference to scoop assembly 10, bag 44 and receptacle 14.

Scoop member 112 may include a plurality of tines 150 which extend outwardly and forwardly from a frame 118. Frame 118 includes a first wall 118*a*, a second wall 118*b*, a third wall 118*c*, and a fourth wall 118*d*, and a fifth wall 118*e* which bound and defines an opening 120. Tines 150 extend forwardly from second wall 118*b* and are spaced apart and separated from each other by apertures 152. Tines 150 may be generally triangular in cross-section and are oriented such that the apex of the triangular shape is presented as part of the upper surface of the bottom wall of scoop member 112. The upper surface of the bottom wall is that surface upon which pet waste will rest. This shape of tine 150 is advantageous because it presents the least surface area that will contact any pet waste when the scoop assembly 110 is used. The shape also makes it easier for the tines 150 to pass through grass. However, any other desired and suitable configuration of tine may be used. A region of each tine 150 adjacent frame 118 is angled in much the same manner as first section 12*b* of scoop assembly 10. The rest of the each tine 150 is substantially parallel to a second wall 114*b* of receptacle 114. Scoop member 112 further includes side walls 112*a*, 112*b* which extend outwardly and forwardly from frame 118. Side walls 112*a*, 112*b* extend upwardly and outwardly from the bottom wall comprised of tines 150. Side walls 112*a*, 112*b* are shown free of apertures but it will be understood that they may include apertures therein.

A door 126 is connected by a hinge (not shown) to first wall 118*a* of frame 118. This hinge is substantially identical in structure and function to any of the hinges described with reference to door 26 and frame 18. Door 126 functions in substantially the same manner as door 26.

An elongate handle 154 may be engaged with first wall 118*a*. Handle 154 may be in the form of a broom-handle type of pole that is threadably engaged in an aperture 156 of a mounting member 148 provided on frame 118. Any other method of securing the pole type handle may also be utilized. Handle 154 may be of a length that is sufficient that the user will not need to bend over to perform the scooping action in order to lift pet waste off a surface such as grass.

Scoop assembly 110 is used by placing a bag, such as bag 44*b* in receptacle 114 and then engaging a top edge of that bag between scoop member 112 and receptacle 114 as has been previously described with reference to receptacle 14 and scoop member 12. While grasping handle 154 and standing upright, the user will pass tines 150 through the grass and under a clump of pet waste. The spaces 152 between tines 150 permit grass to flow therethrough and substantially prevent scoop member 112 from becoming snagged in the grass. The pet waste will slide onto the upper surfaces of tines 150. The user is then able to change the angle of scoop member 112 so that door 126 is caused to move to the open position. This allows the scooped pet waste to slide down the angled back region 150*a* of tines 150, through opening 120 and into the bag in receptacle 114. When scoop assembly 110 is returned to its operational position (shown in FIG. 17), door 126 will return to the closed position under force of gravity. (If door 126 is secured by a spring-loaded hinge, then door 126 will be pushed open by the pet waste and then move back to the closed position.)

When the user is finished picking up pet waste, scoop member 112 is detached from receptacle 114 and the bag 44 with the gathered pet waste therein is disposed of in the manner previously described herein with reference to pet waste scoop assembly 10.

Both the scoop member 12, 112 and the receptacle 14, 114 may be fabricated from a suitably rigid and durable plastic material. This type of material is readily and easily cleaned using water containing a suitable detergent. It will be understood that any other suitable material may be used to fabricate scoop member 12, 112 and receptacle 114.

It will be understood that variations of the above-described pet scoop assembly are possible. For instance, different types of latching mechanisms other than protrusions 34 and apertures 22 may be employed to keep scoop member 12, 112 and receptacle 14, 114 engaged together. Various patterns and placements of apertures 24, 152 in scoop members 12, 112 may be employed and the cross-sectional configuration of tines 23, 150 may be changed. Other ways of mounting the roll of bags (not shown) in the receptacle, including mounting the same on a rod situated within cavity 32 or within compartment 37, are possible.

Scoop assembly 10, 110 may also be used without engaging a disposable bag 44 therein—the user will simply gather the pet waste in the cavity 32 of receptacle 14, 114 and then tip the gathered pet waste directly from the cavity 32 and into the garbage. Receptacle 14, 114 may be provided with ventilation holes or may be provided with another means of securing a bag 44 therein other than trapping the upper edge of the bag between the scoop member 12, 112 and the receptacle 14, 114.

It will further be understood that instead of the door hinge being positioned adjacent a top edge of door 26, 126; the hinge may be positioned along one or the other of the side edges of the door or even along the bottom edge of the door. In the two latter instances a spring-loaded hinge is preferable as moving the assembly 10, 110 between a horizontal position and a vertical position would not necessarily cause the door 26 to swing open or closed under force of gravity.

In one aspect, the invention may provide a method of removing pet waste 47 from a litter box 48 comprising providing a scoop assembly 10 having a scoop member 12; a receptacle 14 detachably engageable with scoop member 12; and a door 26 disposed intermediate scoop member 12 and receptacle 14, said door 26 being movable between an open and closed position; detaching scoop member 12 from receptacle 14; inserting a disposable bag 44 through an opening defined by an outer end of lip 14*f* of receptacle 14 and into a cavity 32 defined in receptacle 14; folding an upper end of bag 44 over the outer end of lip 14*f* of receptacle 14; re-engaging scoop member 12 with receptacle 14; and trapping bag 44 between scoop member 12 and receptacle 14 in an open position (as shown in FIG. 1).

It should be noted that because bag 44 is trapped in this manner, the bag 44 is always held in an open position and cannot be closed unless and until scoop member 12 is detached from receptacle 14. This ensures that any pet waste 47 captured during a scooping action will always be able to slide readily and easily into the interior of the bag and without contacting any part of the receptacle 14.

When scoop assembly 10 is in the position shown in FIG. 1, the assembly is ready for use to remove pet waste 47 from a litter box 48 as illustrated in FIGS. 10-16. Consequently, the method further includes inserting a front end (i.e., third sections 12a') of scoop member 12 into pet litter 46 in litter box 48 (FIGS. 10 and 11); rotating the scoop assembly 10 from a horizontal orientation toward a vertical orientation (FIG. 12); pivoting door 26 to the open position as scoop assembly 10 is rotated; and sliding captured pet waste 47 down the scoop member 12 and into the held-open bag 44. It should be noted that the scoop assembly 10 most desirably used to scoop pet waste 47 from the litter box 48 and then moved to a vertical orientation while scoop assembly 10 is positioned over the box 48. This positioning will ensure that any unclumped pet litter 46 will drop back into box 48 so that the user does not create a mess in the areas surrounding box 48.

The method may further include rotating scoop member 12 from the vertical orientation back toward the horizontal orientation; rotating door 26 to the closed position to trap captured pet waste 47 in bag 44 within receptacle 14; and repeating the steps of inserting front end (i.e., third section 12a') of scoop member 12 into pet litter 46; rotating scoop assembly 10 from the horizontal orientation to the vertical orientation, pivoting door 26 to the open position, and sliding the captured pet waste 47 into the open bag 44.

The method may further include the steps of disengaging scoop member 12 from receptacle 14; withdrawing bag 44 with captured pet waste 47 from the cavity 32 (FIGS. 14 and 15); and disposing of the withdrawn bag 44 in the trash.

The method may further include the steps of withdrawing a new bag 44A from a disposable container 40 retained in a compartment 37 provided on receptacle 14; inserting the new bag 44A into cavity 32 in receptacle 14; folding an upper end of the new bag 44A over outer end of lip 14f of receptacle 14; engaging scoop member 12 with receptacle 14; and trapping the new bag 44A in the open position between scoop member 12 and receptacle 14.

It will be understood that receptacle 14 may be used without the bag 44. In other words, pet waste 47 may be collected directly into the cavity 32 of receptacle 14. Thus, the same method of use set out above, absent the limitations regarding the insertion, clamping engagement and removal of the bag 44, can be practiced with the scoop assembly 10.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

What is claimed:

1. A pet scoop assembly comprising:
a scoop member including a bottom wall formed from an intermediate first section, a proximal second section, and a distal third section;
the first section connected to the second section defining a first angle;
the second section connected to the third section defining a second angle greater than the first angle;
a receptacle engageable with the scoop member adjacent the first section;
a door disposed intermediate the scoop member and the receptacle, the door including an upper end opposite a lower end, and the door being movable between an open position and a closed position; and
a ridge extending outwardly from exterior walls on the receptacle and the ridge abuts an outermost edge of scoop member adapted to act as a stop, thereby limiting the inward travel of scoop member when scoop member and receptacle are engaged with each other.

2. The pet scoop assembly of claim 1, wherein the first angle is in a range from 130° to 135°.

3. The pet scoop assembly of claim 2, wherein the second angle is in a range from 150° to 160°.

4. The pet scoop assembly of claim 1, wherein the second angle is 15° to 30° greater than the first angle.

5. The pet scoop assembly of claim 1, wherein the scoop member further comprises:
a pair of opposing sidewalls extending upwardly from the bottom wall;
each sidewall tapering downward from the proximal second section along the intermediate first section to the distal third section.

6. The pet scoop assembly of claim 5, wherein linear apertures are defined in the pair of opposing sidewalls sized to permit pet litter to fall therethrough.

7. The pet scoop assembly of claim 1, further comprising:
a bottom wall on the receptacle;
wherein when the scoop member is connected to the receptacle, the bottom wall defines an angle relative to the intermediate first section in a range from 145° to 160°.

8. The pet scoop assembly of claim 7, wherein when the scoop member is connected to the receptacle, the bottom wall defines an angle relative to the proximal second section in a range from 25° to 35°.

9. The pet scoop assembly of claim 1, further comprising:
a rim having an angled profile at the terminal end of the third section.

10. The pet scoop assembly of claim 9, wherein the rim is hardened relative to the bottom wall.

11. The pet scoop assembly of claim 9, further comprising rounded corners on the rim adapted to permit the scoop member to fit complementarily with corners in a litter box.

12. A pet scoop assembly comprising:
a scoop member;
a receptacle repeatably and releasably engaged with the scoop member;
a door pivotably connected at an upper end opposite a lower end, and the door being pivotable between an open position and a closed position, wherein the door pivots inwardly into the receptacle when moving from the closed position to the open position;
a latching mechanism for detachably securing the scoop member and receptacle together; and
a ridge extending outwardly from exterior walls on the receptacle and the ridge abuts an outermost edge of scoop member adapted to act as a stop, thereby limiting the inward travel of scoop member when scoop member and receptacle are engaged with each other.

13. The pet scoop assembly of claim 12, wherein the latching mechanism includes:
protrusions on the scoop member, and wherein the receptacle defines apertures shaped complementary to the protrusions to effectuate the repeatable and releasable engagement therebetween.

14. The pet scoop assembly of claim 12, wherein the protrusions are integrally molded with scoop member and are not movable relative thereto.

15. The pet scoop assembly of claim 12, wherein the latching mechanism includes:
protrusions on the receptacle, and wherein the scoop member defines apertures shaped complementary to the protrusions to effectuate the repeatable and releasable engagement therebetween.

16. The pet scoop assembly of claim 12, wherein the latching mechanism includes protrusions integrally molded with receptacle and are not movable relative thereto.

17. The pet scoop assembly of claim 12, further comprising a cantilevered handle extending from a rigid connection with the scoop member and above the receptacle.

18. The pet scoop assembly of claim 17, further comprising:
  a terminal end of the handle; and
  a depressed thumb rest intermediate the rigid connection with the scoop member and the terminal end of the handle.

\* \* \* \* \*

UNITED STATES PATENT AND TRADEMARK OFFICE
CERTIFICATE OF CORRECTION

PATENT NO. : 9,661,825 B2
APPLICATION NO. : 15/225220
DATED : May 30, 2017
INVENTOR(S) : Becattini, Jr. et al.

Page 1 of 1

It is certified that error appears in the above-identified patent and that said Letters Patent is hereby corrected as shown below:

In the Claims

At Column 16, Line 59 (Claim 14), change "claim 12" to --claim 13--.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*